US012296272B2

(12) United States Patent
Miyamoto et al.

(10) Patent No.: US 12,296,272 B2
(45) Date of Patent: May 13, 2025

(54) NON-TRANSITORY STORAGE MEDIUM ENCODED WITH COMPUTER READABLE INFORMATION PROCESSING PROGRAM, INFORMATION PROCESSING SYSTEM, INFORMATION PROCESSING APPARATUS, AND METHOD OF CONTROLLING INFORMATION PROCESSING APPARATUS THAT ALLOW PROCESSING OF OPERATIONS OF CHARACTER OBJECT HIGH IN ZEST

(71) Applicant: NINTENDO CO., LTD., Kyoto (JP)

(72) Inventors: Shigeru Miyamoto, Kyoto (JP); Tatsuo Nomura, Tokyo (JP); Chihiro Kanno, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 200 days.

(21) Appl. No.: 17/900,285

(22) Filed: Aug. 31, 2022

(65) Prior Publication Data

US 2023/0128475 A1 Apr. 27, 2023

(30) Foreign Application Priority Data

Oct. 27, 2021 (JP) ................. 2021-175432

(51) Int. Cl.
*A63F 13/65* (2014.01)
*A63F 13/67* (2014.01)

(52) U.S. Cl.
CPC .............. *A63F 13/65* (2014.09); *A63F 13/67* (2014.09); *A63F 2300/6027* (2013.01); *A63F 2300/69* (2013.01)

(58) Field of Classification Search
CPC ........ A63F 13/65; A63F 13/67; A63F 13/655; A63F 13/213; A63F 13/5255; A63F 2300/6027; A63F 2300/69
See application file for complete search history.

(56) References Cited

U.S. PATENT DOCUMENTS

2014/0092133 A1 4/2014 Hayakawa
2014/0218361 A1 8/2014 Abe et al.
(Continued)

FOREIGN PATENT DOCUMENTS

JP 2012178069 A 9/2012
JP 2014071877 A 4/2014
(Continued)

*Primary Examiner* — James S. McClellan
*Assistant Examiner* — Ross A Williams
(74) *Attorney, Agent, or Firm* — Scully, Scott, Murphy & Presser, P.C.

(57) ABSTRACT

A non-transitory storage medium encoded with a computer readable information processing program executed in a computer of an information processing apparatus including an image pick-up unit that picks up an image of a real space is provided. At least one computer is configured to perform operations including generating an augmented reality image by superimposing a virtual space image corresponding to a virtual space that has been picked up by a virtual camera arranged in the virtual space and a real space image corresponding to the real space that has been picked up by the image pick-up unit on each other, recognizing a feature included in the real space image, and controlling, when the real space image includes a feature as a result of recognition, a character object to perform an action at a position associated with the feature included in the real space image.

20 Claims, 26 Drawing Sheets

(56) References Cited

U.S. PATENT DOCUMENTS

| | | |
|---|---|---|
| 2018/0068488 A1 | 3/2018 | Hart et al. |
| 2019/0364224 A1 | 11/2019 | Nishibe et al. |
| 2020/0061465 A1* | 2/2020 | Benedetto ............... A63F 13/55 |
| 2021/0052976 A1* | 2/2021 | Anderson ............. A63F 13/816 |

FOREIGN PATENT DOCUMENTS

| | | |
|---|---|---|
| JP | 2014149712 A | 8/2014 |
| KR | 20190107012 A | 9/2019 |
| WO | 2016157247 A1 | 10/2016 |

* cited by examiner

FIG.18

| CHARACTER OBJECT | ACTION | MASTERY FLAG |
|---|---|---|
| CHARACTER AAA | SLIDING | OK |
| CHARACTER BBB | CLIMBING | OK |
| CHARACTER CCC | SLIDING | OK |
| CHARACTER DDD | CLIMBING | OK |
| ⋮ | ⋮ | ⋮ |

FIG.22

| CHARACTER OBJECT | ACTION | THE NUMBER OF TIMES OF ACTION PERFORMED | MASTERY FLAG |
|---|---|---|---|
| CHARACTER AAA | SLIDING | 1 | NG |
| CHARACTER CCC | SLIDING | 2 | OK |
| CHARACTER EEE | SLIDING | 4 | OK |
| CHARACTER FFF | SLIDING | 6 | OK |
| CHARACTER GGG | SLIDING | 8 | OK |
| ⋮ | ⋮ | ⋮ | ⋮ |

FIG.23

| SLIDING ACTION ||
|---|---|
| THE NUMBER OF TIMES OF ACTION PERFORMED | ACTION TYPE |
| 2 | SLIDING WHILE SITTING |
| 4 | SLIDING ON ONE'S BACK |
| 6 | SLIDING WHILE FACING REARWARD |
| 8 | SLIDING WHILE TURNING |

FIG.24

| MANNER OF ARRANGEMENT | ACTION |
|---|---|
| SLIDING ACTION | |
| ARRANGEMENT T1 | SLIDING WHILE SITTING |
| ARRANGEMENT T2 | SLIDING ON ONE'S BACK |
| ARRANGEMENT T3 | SLIDING WHILE FACING REARWARD |
| ARRANGEMENT T4 | SLIDING WHILE TURNING |

NON-TRANSITORY STORAGE MEDIUM ENCODED WITH COMPUTER READABLE INFORMATION PROCESSING PROGRAM, INFORMATION PROCESSING SYSTEM, INFORMATION PROCESSING APPARATUS, AND METHOD OF CONTROLLING INFORMATION PROCESSING APPARATUS THAT ALLOW PROCESSING OF OPERATIONS OF CHARACTER OBJECT HIGH IN ZEST

This nonprovisional application claims priority to Japanese Patent Application No. 2021-175432 filed with the Japan Patent Office on Oct. 27, 2021, the entire contents of which are hereby incorporated by reference.

FIELD

The present disclosure relates to an information processing program and particularly to an information processing program that superimposes various types of information on a real space.

BACKGROUND AND SUMMARY

In a field of augmented reality (AR) which is a technology to superimpose various types of information on a real space, for example, a method of showing a virtual object based on an image picked up by a camera has conventionally been disclosed.

Though a conventional technology discloses a method of showing a virtual character object in augmented reality, there is a room for improvement in terms of zest.

The present disclosure was made to solve a problem as above, and an object thereof is to provide a non-transitory storage medium encoded with a computer readable information processing program, an information processing system, an information processing apparatus, and a method of controlling an information processing apparatus that allow processing of operations of a character object high in zest.

According to one example of the present disclosure, a non-transitory storage medium encoded with a computer readable information processing program executed in a computer of an information processing apparatus including an image pick-up unit that picks up an image of a real space is provided. At least one computer is configured to perform operations including arranging an object in a virtual space, arranging a character object in the virtual space, with a determination that the character object has mastered an action brought in correspondence with the object at least based on arrangement of the object and the character object in the virtual space, having the character object and the action stored in a storage in association with each other, generating an augmented reality image by superimposing a virtual space image corresponding to the virtual space that has been picked up by a virtual camera arranged in the virtual space and a real space image corresponding to the real space that has been picked up by the image pick-up unit on each other, recognizing a feature included in the real space image, and controlling, when the real space image includes a feature as a result of recognition and when information indicating mastery by the character object, of the action brought in correspondence with the feature is stored in the storage, the character object to perform the action at a position associated with the feature included in the real space image. According to this configuration, when the real space image includes the feature as a result of recognition and when information indicating mastery by the character object, of the action brought in correspondence with the feature is stored in the storage, the character object is controlled to perform the action at the position associated with the feature included in the real space image. Therefore, processing of operations of the character object high in zest can be performed.

In the exemplary embodiment, the controlling the character object to perform the action includes controlling the character object to perform the action at the position associated with the feature included in the real space image when the real space image includes the feature corresponding to the object as the feature as a result of recognition and when the information indicating mastery by the character object, of the action brought in correspondence with the feature corresponding to the object is stored in the storage. According to this configuration, when the feature corresponding to the object is included as the feature and when information indicating mastery by the character object, of the action brought in correspondence with the feature corresponding to the object is stored in the storage, the character object is controlled to perform the action at the position associated with the feature included in the real space image. Therefore, processing of operations of the character object high in zest can be performed.

In the exemplary embodiment, the controlling the character object to perform the action includes controlling the character object to perform the action at the position associated with the feature included in the real space image when the real space image includes the feature corresponding to the action as the feature as a result of recognition and when the information indicating mastery of the action by the character object is stored in the storage. According to this configuration, when the feature corresponding to the action is included as the feature and when information indicating mastery of the action by the character object is stored in the storage, the character object is controlled to perform the action at the position associated with the feature included in the real space image. Therefore, processing of operations of the character object high in zest can be performed.

In the exemplary embodiment, the at least one computer is configured to perform operations including controlling the character object to perform the action brought in correspondence with the object when the object and the character object are arranged in the virtual space. The having the character object and the action stored in the storage in association with each other has the character object and the action stored in the storage in association with each other with a determination that the character object has mastered the action brought in correspondence with the object at least based on the fact that the character object has performed the action brought in correspondence with the object. According to this configuration, on the assumption that the character object has mastered the action brought in correspondence with the object at least based on the fact that the character object has performed the action brought in correspondence with the object, the character object and the action are stored in the storage in association with each other. Therefore, a user can check in advance what kind of action the character object will perform and expectation for the action by the character object can be enhanced.

In the exemplary embodiment, the having the character object and the action stored in the storage in association with each other includes having the character object and the action stored in the storage in association with each other with a determination that the character object has mastered the action brought in correspondence with the object at least based on the fact that the character object has performed, a plurality of times, the action brought in correspondence with the object. According to this configuration, on the assumption that the character object has mastered the action brought in correspondence with the object at least based on the fact that the character object has performed the action a plurality of times, the character object and the action are stored in the storage in association with each other. Therefore, a user can check in advance the action that will be performed a plurality of times by the character object and expectation for the action by the character object can further be enhanced.

In the exemplary embodiment, the having the character object and the action stored in the storage in association with each other includes having the character object, the action, and a skill level in connection with the action stored in the storage in association with one another. The action includes a plurality of levels. The controlling the character object to perform the action brought in correspondence with the object includes controlling the character object to perform one action among the plurality of levels brought in correspondence with the object in accordance with the skill level in connection with the action. According to this configuration, since the character object performs one action among the plurality of levels brought in correspondence with the object in accordance with the skill level in connection with the action, variations of the action can be enjoyed and zest is enhanced.

In the exemplary embodiment, the object includes a plurality of types of objects. The action includes a plurality of types of actions. One action among the plurality of types of actions is brought in correspondence for each object. According to this configuration, variations of combinations of the plurality of types of objects and the plurality of types of actions can be enjoyed and zest is enhanced.

In the exemplary embodiment, the at least one computer is configured to perform operations including executing a game and giving at least one of a plurality of types of objects that can be arranged in the virtual space in accordance with a status of the game. According to this configuration, since at least one of the plurality of types of objects that can be arranged in the virtual space is given in accordance with a status of the game, a new user experience can be obtained and zest is enhanced.

In the exemplary embodiment, the having the controlling the character object to perform the action includes controlling, when the object and a plurality of character objects are arranged in the virtual space, only a character object that has mastered the action among the plurality of character objects to perform the action. According to this configuration, since only the character object that has mastered the action is controlled to perform the action, zest is enhanced in terms of fun of training.

In the exemplary embodiment, the having the character object and the action stored in the storage in association with each other includes having the character object and the action stored in the storage in association with each other with a determination that a character object that had not mastered the action among the plurality of character objects has mastered the action brought in correspondence with the object at least based on the fact that the character object that had mastered the action among the plurality of character objects has performed the action. According to this configuration, since another character object can master the action based on the fact that a character that had mastered the action has performed the action, zest is enhanced by coordination between the character objects.

In the exemplary embodiment, the character object includes a plurality of types of character objects. The having the character object and the action stored in the storage in association with each other includes, with a determination that a prescribed type of character object among the plurality of types of character objects has mastered the action brought in correspondence with the object at least based on arrangement of the object and the prescribed type of character object in the virtual space, having the prescribed type of character object and the action stored in the storage in association with each other. According to this configuration, since the prescribed type of character object can master the action, zest is enhanced in terms of fun of training of the prescribed type of character object.

In the exemplary embodiment, the at least one computer is configured to perform operations including giving a user information indicating mastery by the character object, of the action brought in correspondence with the object. According to this configuration, since the user is notified of mastery of the action by the character object, the user can readily know mastery of the action by the character object and zest is enhanced.

In the exemplary embodiment, in a first mode, the information processing program has the object arranged in the virtual space, has the character object arranged in the virtual space, and has the character object and the action stored in the storage in association with each other. In a second mode, the augmented reality image is generated by superimposition of the virtual space image corresponding to the virtual space that has been picked up by the virtual camera arranged in the virtual space and the real space image corresponding to the real space that has been picked up by the image pick-up unit on each other, the feature included in the real space image is recognized, and the character object is controlled to perform the action. According to this configuration, in the first mode, the character object masters the action, and in the second mode, the character object performs the mastered action. Therefore, since an action a user is invited to perform is different between the first mode and the second mode, zest is enhanced.

In the exemplary embodiment, the recognizing a feature included in the real space image includes recognizing a feature relating at least to a shape among features included in the real space image. According to this configuration, since the feature relating to the shape included in the real space image is recognized, the user is invited to pick up the real space image with attention being paid to the shape with the use of the image pick-up unit. Therefore, zest is enhanced.

In the exemplary embodiment, the arranging an object in a virtual space includes arranging the object in the virtual space in accordance with an operation by a user. The action includes a plurality of types of actions different for each manner of arrangement of the object. The having the character object and the action stored in the storage in association with each other includes having the character object and the action stored in the storage in association with each other with a determination that the character object has mastered one action among the plurality of types of actions brought in correspondence with the object based on arrangement of the object and the character object in the virtual space and the manner of arrangement. According to this configuration, the manner of arrangement of the object can be changed in accordance with an operation by the user, and the character object masters one action among the plurality of types of actions based on the manner of arrangement. Therefore, zest for the manner of arrangement of the object in accordance with the operation by the user is enhanced.

An information processing system according to another example of the present disclosure includes an information processing apparatus including an image pick-up unit that picks up an image of a real space. The information processing apparatus includes at least one computer and a memory. The computer arranges an object in a virtual space, arranges a character object in the virtual space, with a determination that the character object has mastered an action brought in correspondence with the object at least based on arrangement of the object and the character object in the virtual space, has the character object and the action stored in a storage in association with each other, generates an augmented reality image by superimposing a virtual space image corresponding to the virtual space that has been picked up by a virtual camera arranged in the virtual space and a real space image corresponding to the real space that has been picked up by the image pick-up unit on each other, recognizes a feature included in the real space image, and controls, when the real space image includes a feature as a result of recognition and when information indicating mastery by the character object, of the action brought in correspondence with the feature is stored in the storage, the character object to perform the action at a position associated with the feature included in the real space image. According to this configuration, when the real space image includes the feature as a result of recognition and when information indicating mastery by the character object, of the action brought in correspondence with the feature is stored in the storage, the character object is controlled to perform the action at the position associated with the feature included in the real space image. Therefore, processing of operations of the character object high in zest can be performed.

In the exemplary embodiment, the controlling the character object to perform the action includes controlling the character object to perform the action at the position associated with the feature included in the real space image when the real space image includes the feature corresponding to the object as the feature as a result of recognition and when the information indicating mastery by the character object, of the action brought in correspondence with the feature corresponding to the object is stored in the storage. According to this configuration, when the feature corresponding to the object is included as the feature and when information indicating mastery by the character object, of the action brought in correspondence with the feature corresponding to the object is stored in the storage, the character object is controlled to perform the action at the position associated with the feature included in the real space image. Therefore, processing of operations of the character object high in zest can be performed.

In the exemplary embodiment, the controlling the character object to perform the action includes controlling the character object to perform the action at the position associated with the feature included in the real space image when the real space image includes the feature corresponding to the action as the feature as a result of recognition and when the information indicating mastery of the action by the character object is stored in the storage. According to this configuration, when the feature corresponding to the action is included as the feature and when information indicating mastery of the action by the character object is stored in the storage, the character object is controlled to perform the action at the position associated with the feature included in the real space image. Therefore, processing of operations of the character object high in zest can be performed.

An information processing apparatus according to yet another example of the present disclosure is an information processing apparatus including an image pick-up unit that picks up an image of a real space. The information processing apparatus includes at least one computer and a memory. The computer arranges an object in a virtual space, arranges a character object in the virtual space, with a determination that the character object has mastered an action brought in correspondence with the object at least based on arrangement of the object and the character object in the virtual space, has the character object and the action stored in a storage in association with each other, generates an augmented reality image by superimposing a virtual space image corresponding to the virtual space that has been picked up by a virtual camera arranged in the virtual space and a real space image corresponding to the real space that has been picked up by the image pick-up unit on each other, recognizes a feature included in the real space image, and controls, when the real space image includes a feature as a result of recognition and when information indicating mastery by the character object, of the action brought in correspondence with the feature is stored in the storage, the character object to perform the action at a position associated with the feature included in the real space image. According to this configuration, when the real space image includes the feature as a result of recognition and when information indicating mastery by the character object, of the action brought in correspondence with the feature is stored in the storage, the character object is controlled to perform the action at the position associated with the feature included in the real space image. Therefore, processing of operations of the character object high in zest can be performed.

A method of controlling an information processing apparatus including an image pick-up unit that picks up an image of a real space according to yet another example of the present disclosure includes arranging an object in a virtual space, arranging a character object in the virtual space, with a determination that the character object has mastered an action brought in correspondence with the object at least based on arrangement of the object and the character object in the virtual space, having the character object and the action stored in a storage in association with each other, generating an augmented reality image by superimposing a virtual space image corresponding to the virtual space that has been picked up by a virtual camera arranged in the virtual space and a real space image corresponding to the real space that has been picked up by the image pick-up unit on each other, recognizing a feature included in the real space image, and controlling, when the real space image includes a feature as a result of recognition and when information indicating mastery by the character object, of the action brought in correspondence with the feature is stored in the storage, the character object to perform the action at a position associated with the feature included in the real space image. According to this configuration, when the real space image includes the feature as a result of recognition and when information indicating mastery by the character object, of the action brought in correspondence with the feature is stored in the storage, the character object is controlled to perform the action at the position associated with the feature included in the real space image. Therefore, processing of operations of the character object high in zest can be performed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 shows an exemplary illustrative non-limiting drawing illustrating a mastery table registered in processing by action storage unit 202 provided by game program 122 based on the embodiment.

FIG. 22 shows an exemplary illustrative non-limiting drawing illustrating a mastery table registered in processing by action storage unit 202 provided by game program 122 based on the first modification of the embodiment.

FIG. 23 shows an exemplary illustrative non-limiting drawing illustrating an action table of actions mastered in processing by action storage unit 202 provided by game program 122 based on the first modification of the embodiment.

FIG. 24 shows an exemplary illustrative non-limiting drawing illustrating another action table of actions mastered in processing by action storage unit 202 provided by game program 122 based on the first modification of the embodiment.

DETAILED DESCRIPTION OF NON-LIMITING EXAMPLE EMBODIMENTS

Figure 1:
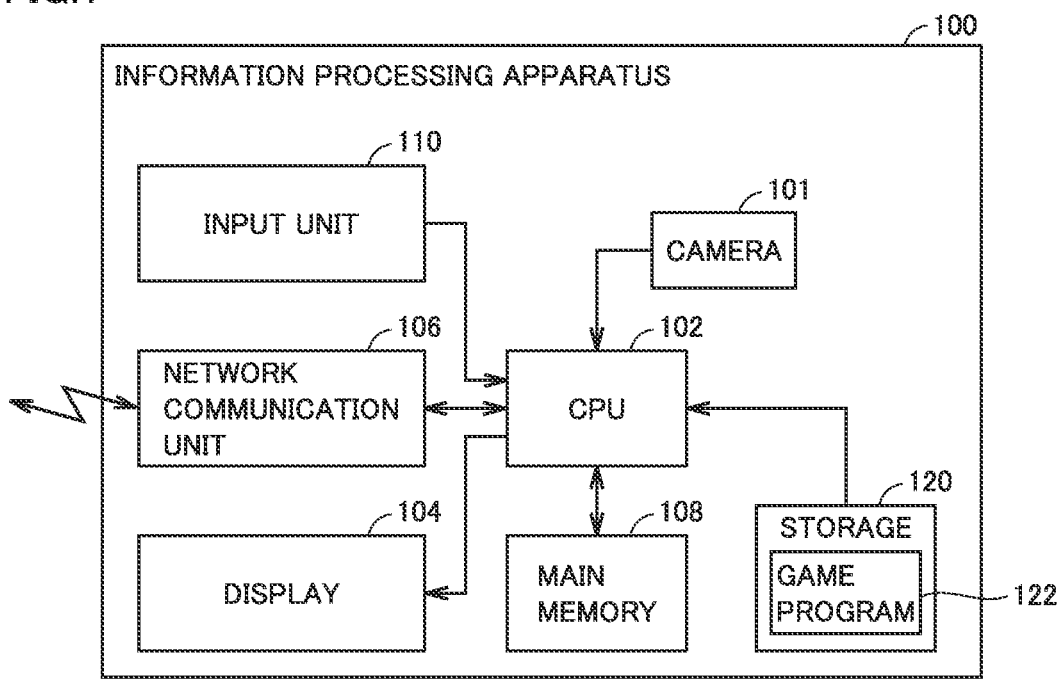
FIG. 1 shows an exemplary illustrative non-limiting drawing of a hardware configuration of an information processing apparatus 100 based on an embodiment.

This embodiment will be described in detail with reference to the drawings. The same or corresponding elements in the drawings have the same reference characters allotted and description thereof will not be repeated.

[A. Configuration of Information Processing Apparatus]

FIG. 1 is a diagram illustrating a hardware configuration of an information processing apparatus 100 based on an embodiment. By way of example, a configuration where the information processing apparatus according to the embodiment is mounted as a game device will be described.

As shown in FIG. 1, information processing apparatus 100 may be any computer. Information processing apparatus 100 may be, for example, a portable (also referred to as mobile) device such as a portable game device, a portable telephone, or a smartphone, a stationary apparatus such as a personal computer or a home game console, or a large apparatus such as an arcade game machine for a commercial purpose.

The hardware configuration of information processing apparatus 100 is outlined below.

Information processing apparatus 100 includes a CPU 102 and a main memory 108. CPU 102 is an information processor that performs various types of information processing in information processing apparatus 100. CPU 102 performs the various types of information processing by using main memory 108.

Information processing apparatus 100 includes a storage 120. Storage 120 stores various programs (which may include not only a game program 122 but also an operating system) executed in information processing apparatus 100. Any storage (storage medium) accessible by CPU 102 is adopted as storage 120. For example, a storage embedded in information processing apparatus 100 such as a hard disk or a memory, a storage medium attachable to and removable from information processing apparatus 100 such as an optical disc or a cartridge, or combination of a storage and a storage medium as such may be adopted as storage 120. In such a case, a game system representing an exemplary information processing system including information processing apparatus 100 and any storage medium may be configured.

Game program 122 includes computer-readable instructions for performing game processing as will be described later. The game program may also include a program that establishes data communication with a not-shown server and a program that establishes data communication with another information processing apparatus as a part of game processing.

Information processing apparatus 100 includes an input unit 110 that accepts an instruction from a user, such as a button or a touch panel. Information processing apparatus 100 includes a display 104 that shows an image generated through information processing. In the present example, a configuration provided with a touch panel representing input unit 110 on display 104 which is a screen will be described by way of example. Without being limited to the configuration, various input forms and representation forms can be adopted.

Information processing apparatus 100 includes a network communication unit 106. Network communication unit 106 may be connected to a not-shown network and may perform processing for data communication with an external apparatus (for example, a server or another information processing apparatus).

Information processing apparatus 100 includes a camera 101. Camera 101 picks up an image of a real space. Camera 101 may be a monocular camera or a pantoscopic camera.

Information processing apparatus 100 may be implemented by a plurality of apparatuses. For example, information processing apparatus 100 may be implemented by a main body apparatus including CPU 102 and an apparatus including input unit 110 and/or display 104, which are separate from each other. For example, in another embodiment, information processing apparatus 100 may be implemented by a main body apparatus and a terminal device including input unit 110 and display 104, or by a main body apparatus and an operation apparatus including input unit 110. Information processing apparatus 100 may employ a television as a display apparatus, without including display 104.

In another embodiment, at least some of information processing performed in information processing apparatus 100 may be performed as being distributed among a plurality of apparatuses that can communicate over a network (a wide range network and/or a local network).

[B. Functional Configuration for Implementing Game Processing]

Figure 2:
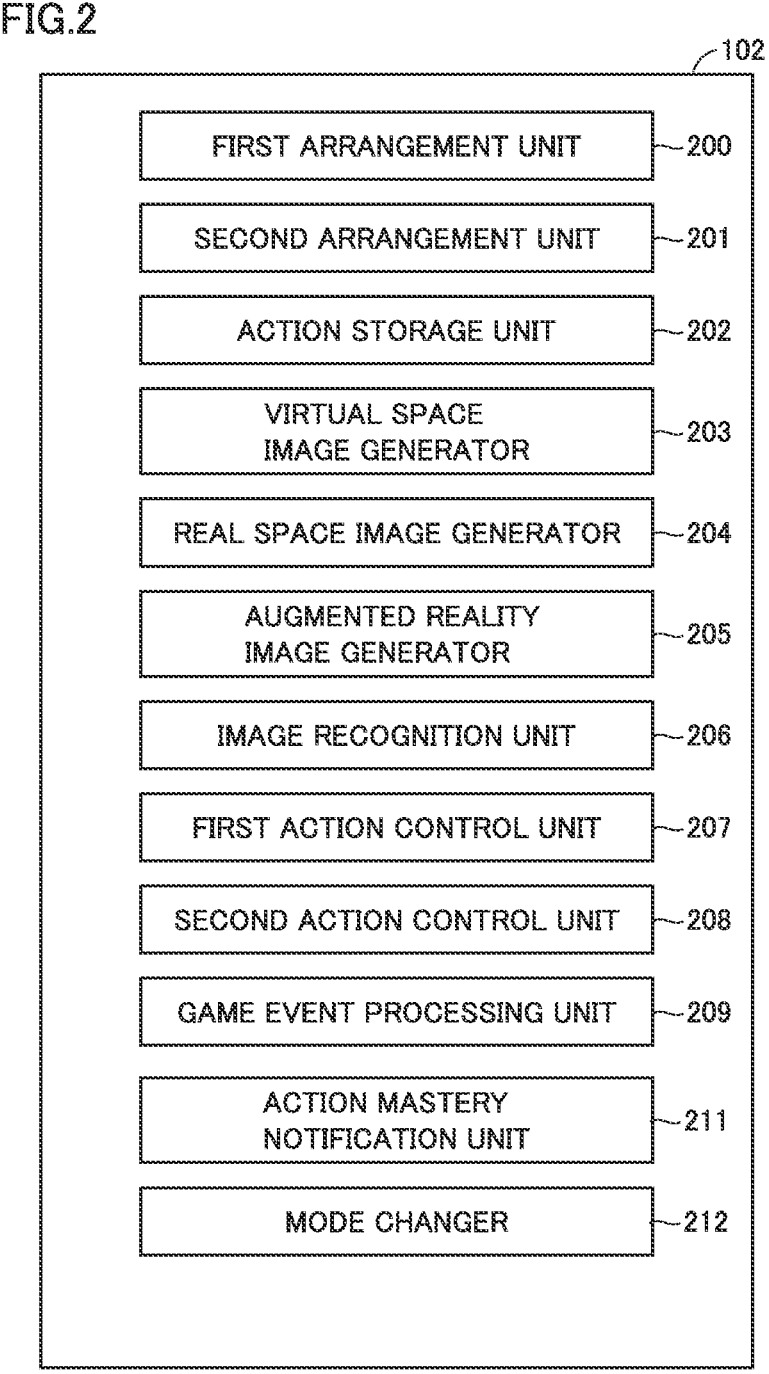
FIG. 2 shows an exemplary illustrative non-limiting drawing of a functional block of information processing apparatus 100 based on the embodiment.

FIG. 2 is a diagram illustrating a functional block of information processing apparatus 100 based on the embodiment. Referring to FIG. 2, information processing apparatus 100 includes a first arrangement unit 200, a second arrangement unit 201, an action storage unit 202, a virtual space image generator 203, a real space image generator 204, an augmented reality image generator 205, an image recognition unit 206, a first action control unit 207, a second action control unit 208, a game event processing unit 209, an action mastery notification unit 211, and a mode changer 212.

First arrangement unit 200 arranges an item object (object) in a virtual space (by way of example, on a game field). Second arrangement unit 201 arranges a character object in the virtual space (by way of example, on the game field).

Virtual space image generator 203 generates a virtual space image corresponding to the virtual space that is picked up by a virtual camera arranged in the virtual space.

Real space image generator 204 generates a real space image corresponding to the real space that is picked up by camera 101.

Augmented reality image generator 205 generates an augmented reality image by superimposing the virtual space image generated by virtual space image generator 203 and the real space image generated by real space image generator 204 on each other.

Image recognition unit 206 recognizes a feature included in the real space image generated by augmented reality image generator 205.

When the real space image includes a feature as a result of recognition by image recognition unit 206 and information indicating mastery by the character object, of an action brought in correspondence with the feature is stored in storage 120, first action control unit 207 controls the character object to perform the action at a position associated with the feature included in the real space image. When the real space image includes a feature corresponding to an item object as the feature as a result of recognition by image recognition unit 206 and information indicating mastery by the character object, of the action brought in correspondence with the feature corresponding to the item object is stored in storage 120, first action control unit 207 may control the character object to perform the action at a position associated with the feature included in the real space image. When the real space image includes a feature corresponding to the action as the feature as a result of recognition by image recognition unit 206 and information indicating mastery of the action by the character object is stored in storage 120, first action control unit 207 may control the character object to perform the action at a position associated with the feature included in the real space image.

When the item object and the character object are arranged in the virtual space (by way of example, on the game field), second action control unit 208 controls the character object to perform the action brought in correspondence with the item object.

On the assumption that the character object has mastered the action brought in correspondence with the item object at least based on arrangement of the item object and the character object in the virtual space (by way of example, on the game field), action storage unit 202 has the character object and the action stored in storage 120 in association with each other. When the item object and the character object are arranged in the virtual space (by way of example, on the game field), on the assumption that the character object has mastered the action brought in correspondence with the item object based on satisfaction of another condition, action storage unit 202 may have the character object and the action stored in storage 120 in association with each other. For example, when the item object and the character object are arranged in the virtual space (by way of example, on the game field), on the assumption that the character object has mastered the action brought in correspondence with the item object at least based on the fact that the character object has performed the action brought in correspondence with the item object, action storage unit 202 may have the character object and the action stored in storage 120 in association with each other.

When a game satisfies a prescribed condition, game event processing unit 209 executes a game event. Game event processing unit 209 gives as a game event, at least one of a plurality of types of item objects that can be arranged in the virtual space (by way of example, on the game field).

Action mastery notification unit 211 gives a user information indicating mastery by the character object, of the action brought in correspondence with the item object.

[C. Overview of Game Processing]

Game processing provided by execution of game program 122 according to the embodiment will now be outlined.

Game program 122 according to the embodiment provides a training game in which a user trains a character object by arranging an item object in the virtual space (by way of example, on the game field). By way of example, by arranging an item object in the virtual space (by way of example, on the game field), the character object masters an action (skill) brought in correspondence with the item object. Then, in augmented reality, the character object performs the mastered action (skill) at a position associated with a feature included in the real space image. Processing of operations of the character object high in zest in augmented reality can be performed.

[D. Exemplary Screen Representation in Game Processing]

An exemplary screen representation and an exemplary operation in game processing provided by execution of game program 122 according to the embodiment will now be described. By way of example, the exemplary screen representation is shown on display 104 of information processing apparatus 100.

In the present example, game processing in a first mode (virtual space mode) and game processing in a second mode (augmented reality mode) switching between which can be made are provided. Game processing in the first mode (virtual space mode) is game processing in the virtual space. Game processing in the second mode (augmented reality mode) is game processing in the augmented reality space.

In game processing in the first mode (virtual space mode), a virtual space image in the virtual space is shown on display 104.

In game processing in the second mode (augmented reality mode), an augmented reality image obtained by superimposition of a virtual space image in the virtual space and a real space image in the real space on each other is shown on display 104.

Figure 3:
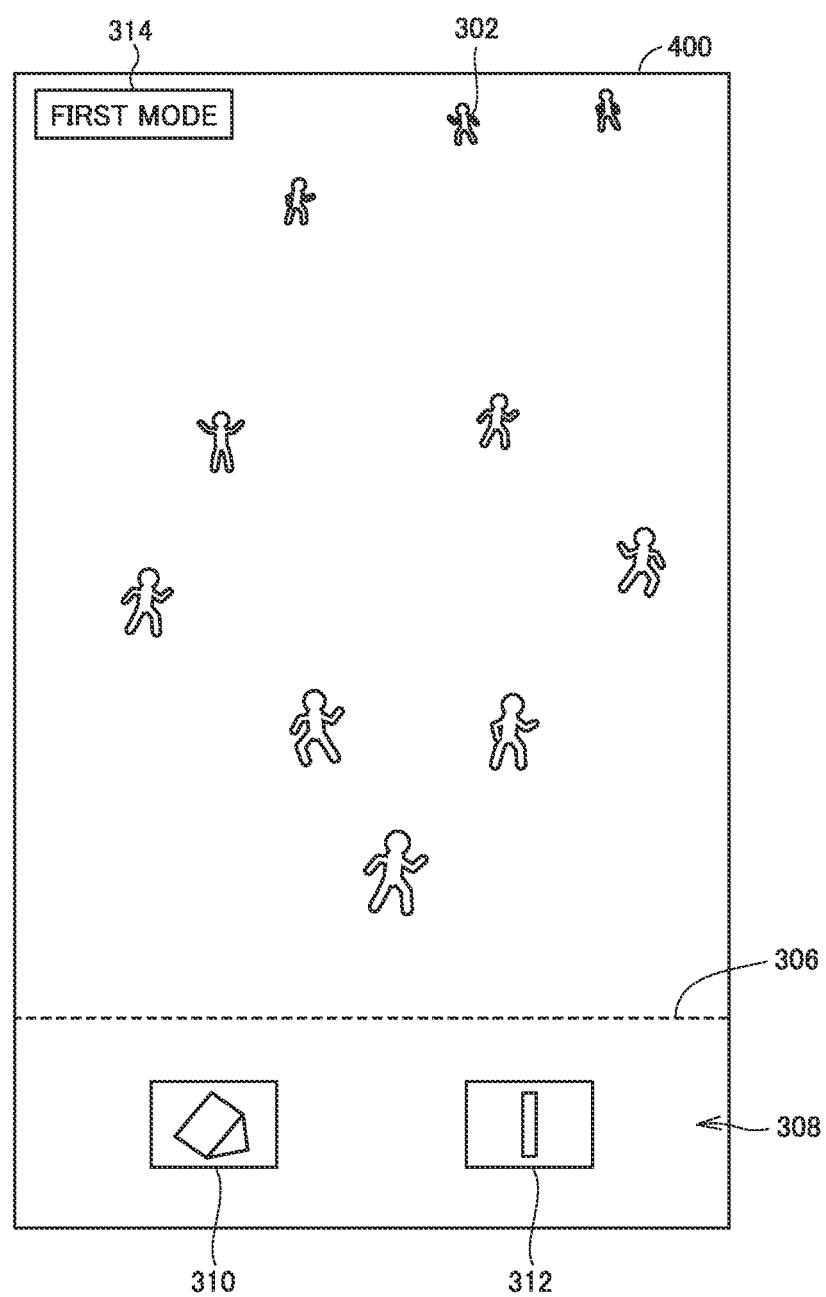
FIG. 3 shows an exemplary illustrative non-limiting drawing illustrating a screen 400 during a game in game processing provided by a game program 122 based on the embodiment.

FIG. 3 is a diagram illustrating a screen 400 during a game in game processing provided by game program 122 based on the embodiment.

As shown in FIG. 3, a plurality of character objects 302 are arranged in screen 400. In the present example, a game field is set within a three-dimensional virtual space. For example, by way of example, a horizontal ground is set and a plurality of character objects 302 are arranged on the ground. By way of example, an example in which ten character objects 302 are shown is illustrated. The virtual camera is arranged at a position where it looks down the game field obliquely below, and character object 302 in an upper portion in game 400 is assumed as a character object far from the virtual camera, and character object 302 in a lower portion is assumed as a character object close to the virtual camera. The game field does not have to be the ground and it may be a space with a height. In the present example, though an example in which character objects are arranged on the game field expressed as the ground is described by way of example, the character objects do not necessarily have to be in contact with the ground, and for example, they may be flying.

FIG. 3 shows an item object selection region 308 in the lower portion. Item object selection region 308 may initially be shown on game 400 or may be shown in accordance with an instruction from the user. A region below a dotted line 306 in screen 400 is set as item object selection region 308.

In item object selection region 308, two types of selectable item objects 310 and 312 are arranged. Item object 310 is an object in a shape of a "slide". Item object 312 is an object in a shape of a "climbing pole."

Item object ("slide") 310 is brought in correspondence with a "sliding" action and character object 302 performs the "sliding" action with respect to item object 310 as will be described later. By performing the "sliding" action with respect to item object 310 as will be described later, character object 302 masters the "sliding" action as the skill. By way of example, the "sliding" action represents processing to carry out movement control for character object 302 to climb up from a lower end to an upper end of a slope of item object 310 ("slide") and to thereafter carry out movement control to slide down the slope of item object 310 ("slide") from the upper end thereof. The "sliding" action is not limited to that movement control and various types of movement processing are applicable. For example, movement control to have character object 302 jump from the lower end to the upper end of the slope of item object 310 ("slide") may be carried out and thereafter movement control to slide down the slope of item object 310 ("slide") from the upper end thereof may be carried out.

Item object 312 ("climbing pole") is brought in correspondence with a "climbing" action, and character object 302 performs the "climbing" action with respect to item object 312 as will be described later. By performing the "climbing" action with respect to item object 312 as will be described later, character object 302 masters the "climbing" action as the skill. By way of example, the "climbing" action represents processing for carrying out movement control for character object 302 to climb up to an upper end of a column of item object 312 ("climbing pole") and thereafter carrying out movement control to climb down to a lower end of the column of item object 312 ("climbing pole"). The "climbing" action is not limited to that movement control and various types of movement processing are applicable. For example, movement control to have character object 302 climb up to the upper end of the column of item object 312 ("climbing pole") may be carried out, and thereafter movement control to have character object 302 jump down to the lower end of the column of item object 312 ("climbing pole") may be carried out.

Item objects 310 ("slide") and 312 ("climbing pole") are each movable by touching by the user. Specifically, item object 310 is movable as a user moves a touch position beyond dotted line 306 while the user keeps touching item object 310. In this case, item object 310 ("slide") moves over the game field in accordance with the touch position. When touching onto item object 310 ("slide") is canceled, item object 310 ("slide") is arranged at a position resulting from movement over the game field. This is also applicable to item object 312 ("climbing pole").

Therefore, the user can arrange item object 310 ("slide") or 312 ("climbing pole") at any position on the game field.

Though a scheme for arranging item object 310 ("slide") or 312 ("climbing pole") at any position on the game field in accordance with a position touched by the user is described in the present example, without being limited as such, item object 310 ("slide") or 312 ("climbing pole") may automatically be arranged at a central position in the game field shown on screen 400 by touching by the user onto item object 310 ("slide") or 312 ("climbing pole").

In FIG. 3, a mode change button 314 is provided in an upper left portion in screen 400. Mode change button 314 is a button for switching between the modes for game processing. By selecting mode change button 314, the mode for game processing is changed from the first mode (virtual space mode) to the second mode (augmented reality mode). By selecting mode change button 314, the mode for game processing is changed from the second mode (augmented reality mode) to the first mode (virtual space mode). The present example shows game processing in the "first mode."

Though a configuration in which the button for switching between the modes for game processing is shown on screen 400 is described in the present example, without being limited to the configuration, the mode for game processing may be switched in accordance with a prescribed input operation onto input unit 110. A scheme for input onto input unit 110 is not limited.

<Skill: "Sliding" Action>

Figure 4:
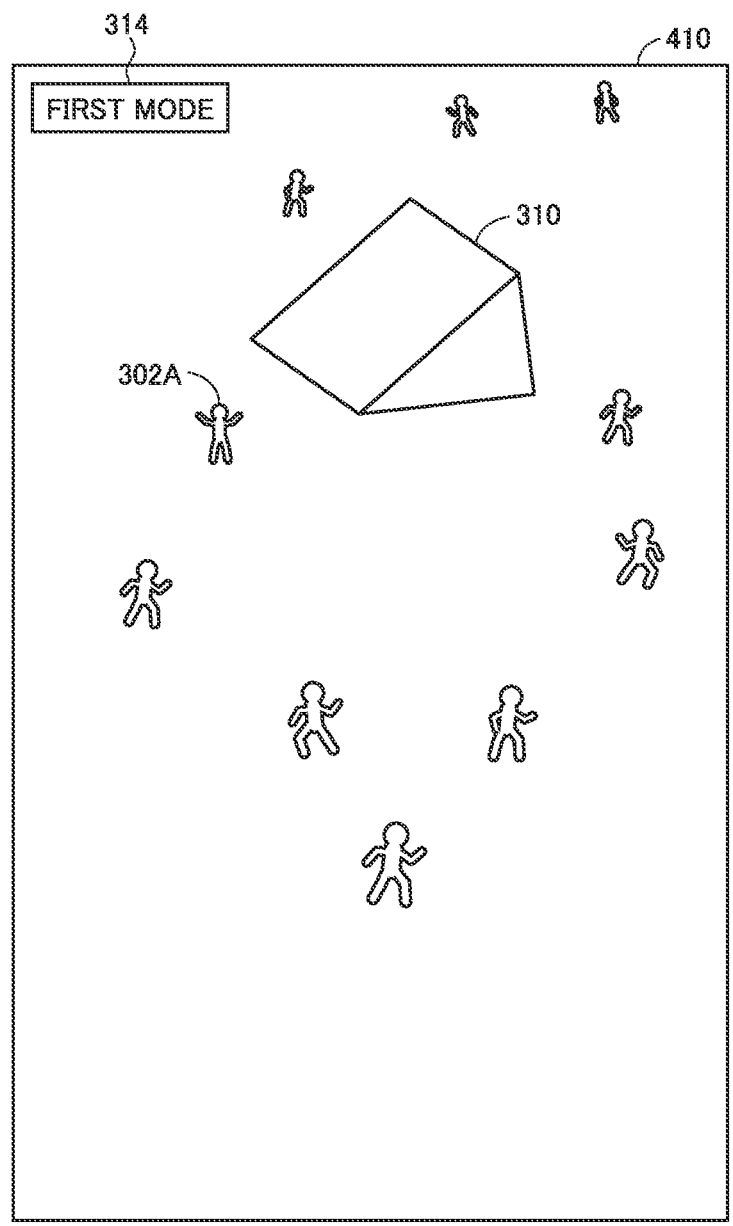
FIG. 4 shows an exemplary illustrative non-limiting drawing illustrating arrangement of an item object 310 ("slide") by a first arrangement unit 200 in the game processing provided by game program 122 based on the embodiment.

FIG. 4 is a diagram illustrating arrangement of item object 310 ("slide") by first arrangement unit 200 in game processing provided by game program 122 based on the embodiment.

FIG. 4 shows an example in which a user touches item object 310 ("slide") on a screen 410 and thereafter cancels touching at a position beyond the dotted line. In this case, first arrangement unit 200 arranges item object 310 ("slide") at a position on the game field where the user canceled the touch position.

Item object 310 ("slide") is arranged as an object with respect to which character object 302 performs the "sliding" action as the skill and arranged in order for character object 302 to master the "sliding" action.

By way of example, movement control for having character object 302 near item object 310 ("slide") perform the "sliding" action is carried out. Specifically, whether or not a distance between a central point of item object 310 ("slide") and character object 302 is equal to or shorter than a prescribed distance is determined. By way of example, an example in which the distance from a character object 302A among a plurality of character objects 302 to the central point of item object 310 ("slide") is equal to or shorter than the prescribed distance will be described.

When the distance between the central point of item object 310 ("slide") and character object 302A is equal to or shorter than the prescribed distance, character object 302A is subjected to movement control to perform the action corresponding to item object 310 ("slide"). A range of the prescribed distance as a prescribed condition can be modified as appropriate.

Figure 5:
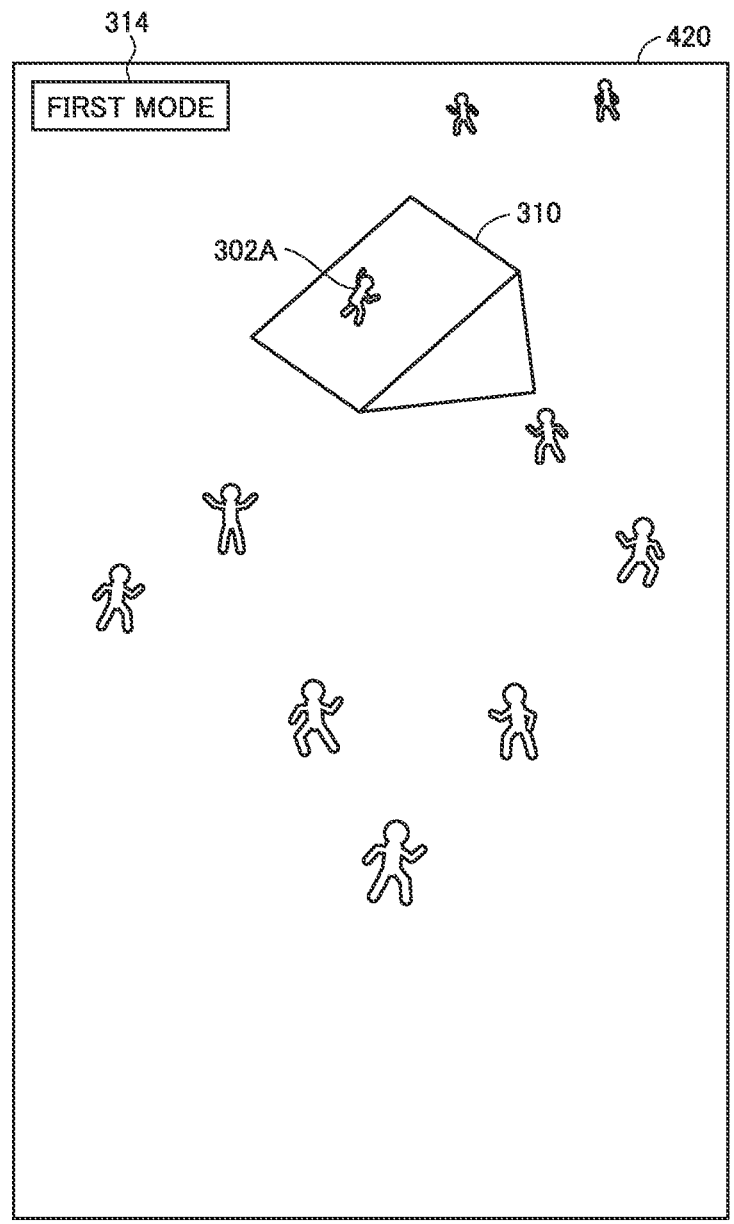
FIG. 5 shows an exemplary illustrative non-limiting drawing illustrating movement control (No. 1) of a character object 302A with respect to item object 310 ("slide") by a second action control unit 208 in the game processing provided by game program 122 based on the embodiment.

FIG. 5 is a diagram illustrating movement control (No. 1) of character object 302A with respect to item object 310 ("slide") by second action control unit 208 in game processing provided by game program 122 based on the embodiment.

FIG. 5 shows exemplary movement control in which second action control unit 208 controls character object 302A to move to the lower end of the slope of item object 310 ("slide") and to climb from the lower end up to the upper end of the slope of item object 310 ("slide") on a screen 420.

Figure 6:
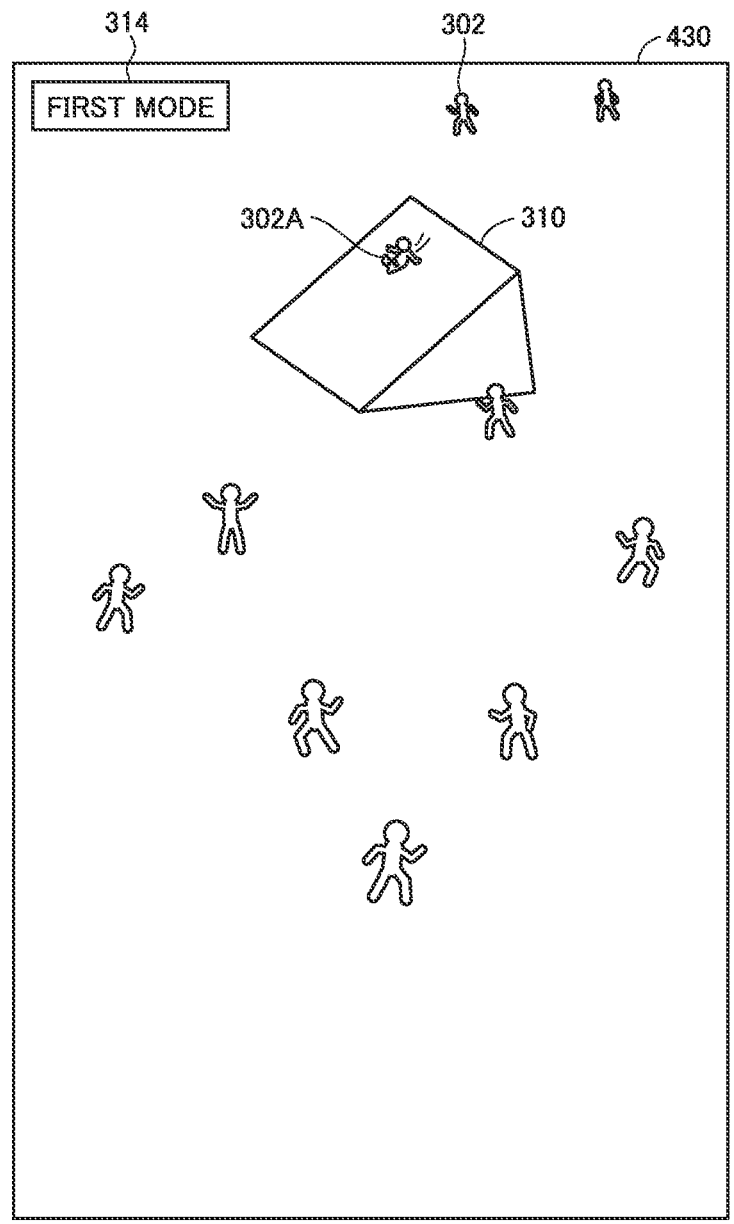
FIG. 6 shows an exemplary illustrative non-limiting drawing illustrating movement control (No. 2) of character object 302A with respect to item object 310 ("slide") by second action control unit 208 in the game processing provided by game program 122 based on the embodiment.

FIG. 6 is a diagram illustrating movement control (No. 2) of character object 302A with respect to item object 310 ("slide") by second action control unit 208 in game processing provided by game program 122 based on the embodiment.

FIG. 6 shows exemplary movement control in which second action control unit 208 controls character object 302A to move to the upper end of the slope of the slide representing item object 310 and thereafter to slide down the slope of item object 310 ("slide") on a screen 430.

Figure 7:
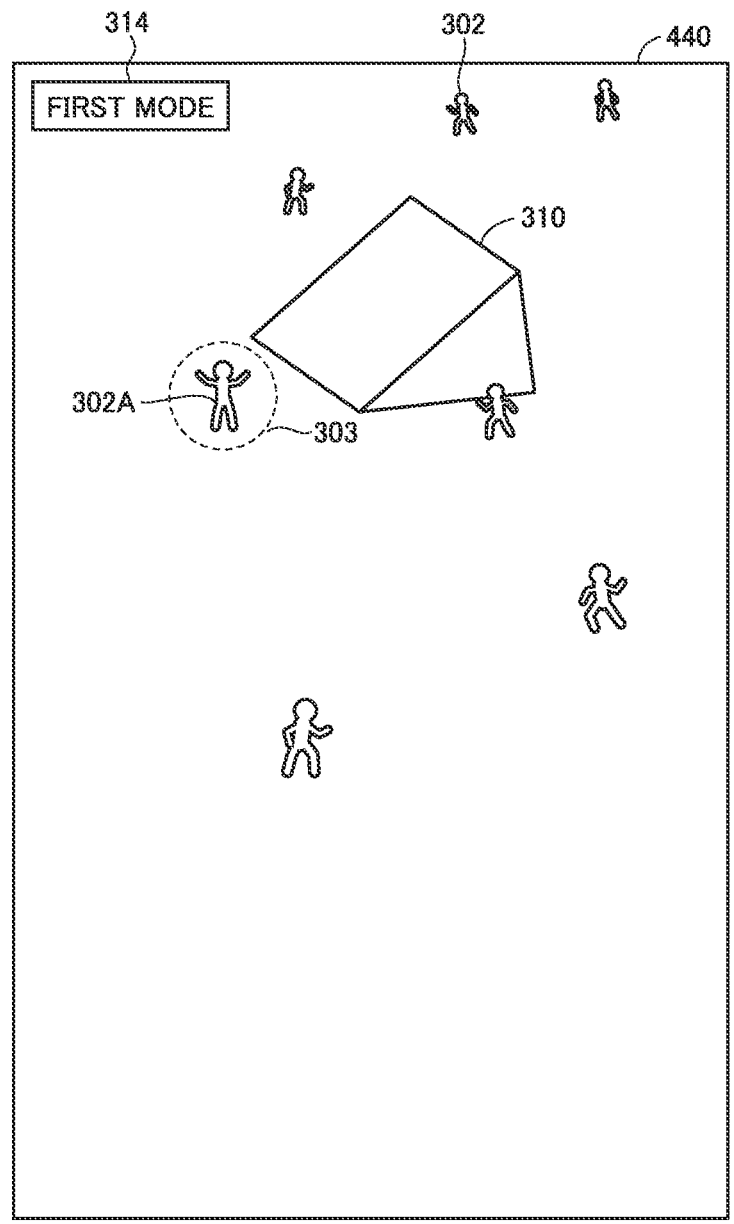
FIG. 7 shows an exemplary illustrative non-limiting drawing illustrating processing for giving a notification about mastery of an action by character object 302A with respect to item object 310 ("slide") by an action mastery notification unit 211 in the game processing provided by game program 122 based on the embodiment.

FIG. 7 is a diagram illustrating processing for giving a notification about mastery of the action by character object 302A with respect to item object 310 ("slide") by action mastery notification unit 211 in game processing provided by game program 122 based on the embodiment.

FIG. 7 shows an example in which character object 302A finishes sliding down the slope of item object 310 ("slide") on a screen 440 and thereafter action mastery notification unit 211 gives a notification about a state of mastery of the action to slide over item object 310 ("slide"). A circle 303 means emphasized representation of character object 302A. Any scheme may be adopted so long as the user can be notified of change in state of character object 302A, and for example, a color of character object 302A may be changed, character object 302A may flash, or character object 302A may jump. Characters "mastered" may be shown.

On the assumption that character object 302A has mastered the "sliding" action brought in correspondence with item object 310 ("slide"), action storage unit 202 thus has character object 302A and the "sliding" action stored in storage 120 in association with each other.

When a feature corresponding to item object 310 ("slide") or a feature corresponding to the "sliding" action is included as a feature included in the real space image of augmented reality, character object 302A that has mastered the "sliding" action is subjected to movement control by first action control unit 207 to perform the "sliding" action at a position associated with the feature included in the real space image. By way of example, when presence of a geometrical object similar to the feature (slope) of item object 310 ("slide") in the real space image is recognized, character object 302A is subjected to movement control by first action control unit 207 to perform the "sliding" action at the position of the geometrical object.

<Skill: "Climbing" Action>

Figure 8:
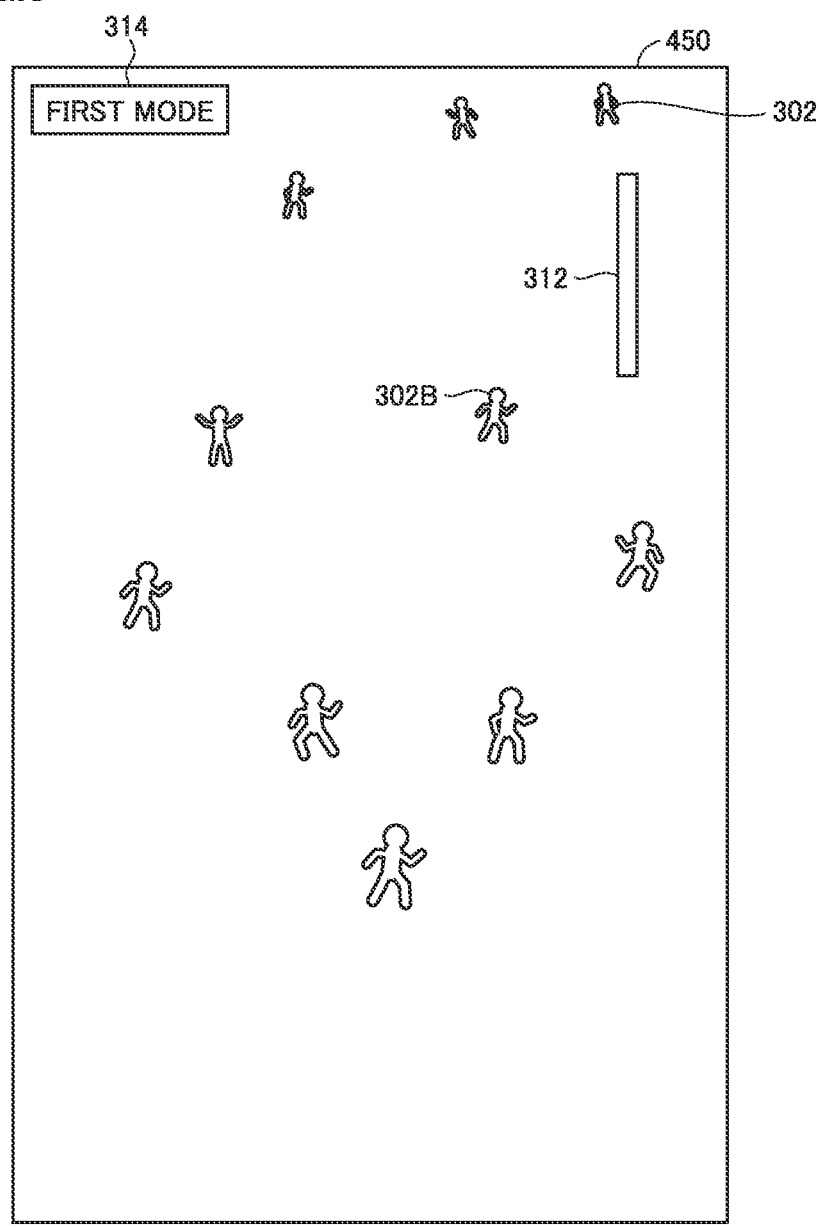
FIG. 8 shows an exemplary illustrative non-limiting drawing illustrating arrangement of an item object 312 ("climbing pole") by first arrangement unit 200 in the game processing provided by game program 122 based on the embodiment.

FIG. 8 is a diagram illustrating arrangement of item object 312 ("climbing pole") by first arrangement unit 200 in game processing provided by game program 122 based on the embodiment.

FIG. 8 shows an example where the user touches item object 312 ("climbing pole") and thereafter cancels touching at a position beyond the dotted line on a screen 450. In this case, first arrangement unit 200 arranges item object 312 ("climbing pole") at the position on the game field where the user canceled the touch position.

Item object 312 ("climbing pole") is arranged as an object with respect to which character object 302 performs the "climbing" action and arranged for character object 302 to master the "climbing" action as the skill.

By way of example, movement control for character object 302 near item object 312 ("climbing pole") to perform the "climbing" action is carried out. Specifically, whether or not a distance between a central point of item object 312 ("climbing pole") and a character object 302B is equal to or shorter than a prescribed distance is determined. By way of example, an example in which the distance from character object 302B among a plurality of character objects 302 to the central point of item object 312 ("climbing pole") is equal to or shorter than the prescribed distance will be described.

When the distance between the central point of item object 312 ("climbing pole") and character object 302B is equal to or shorter than the prescribed distance, character object 302B is subjected to movement control to perform the action corresponding to item object 312 ("climbing pole"). A range of the prescribed distance as a prescribed condition can be modified as appropriate.

Figure 9:
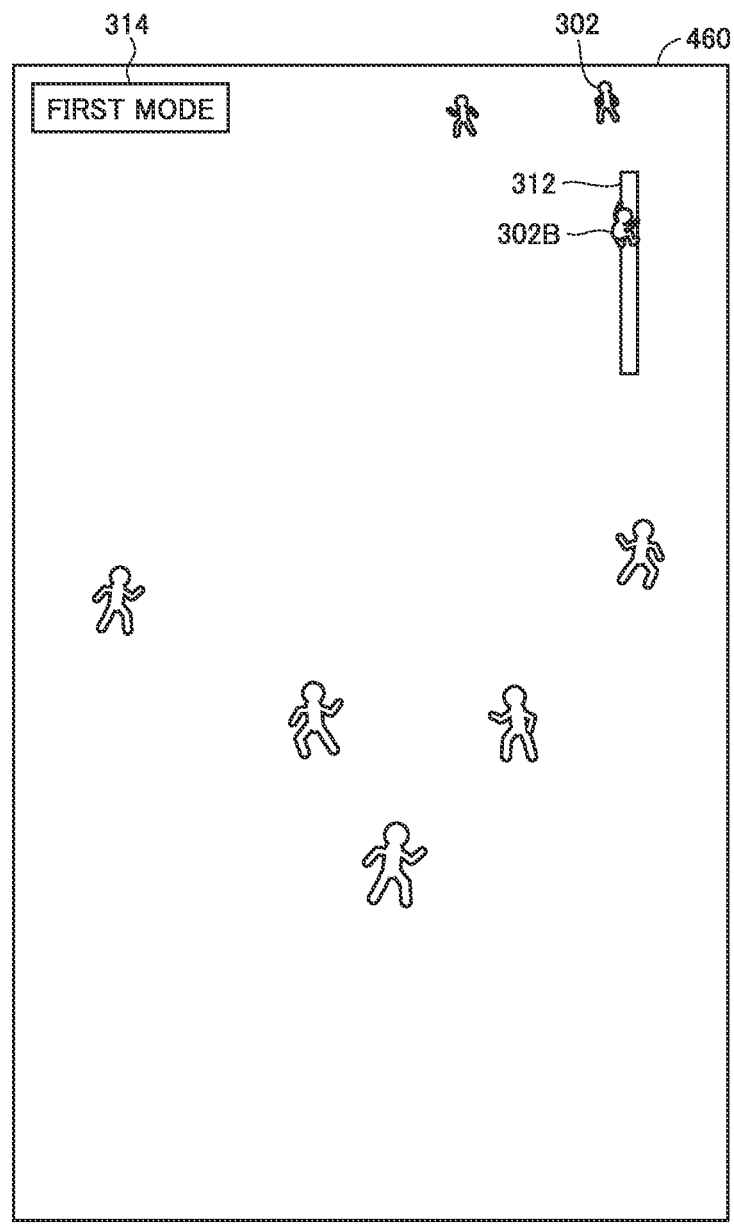
FIG. 9 shows an exemplary illustrative non-limiting drawing illustrating movement control (No. 1) of a character object 302B with respect to item object 312 ("climbing pole") by second action control unit 208 in the game processing provided by game program 122 based on the embodiment.

FIG. 9 is a diagram illustrating movement control (No. 1) of character object 302B with respect to item object 312 ("climbing pole") by second action control unit 208 in game processing provided by game program 122 based on the embodiment.

FIG. 9 shows exemplary movement control in which second action control unit 208 controls character object 302B to move to the lower end of the column of item object 312 ("climbing pole") and to climb from the lower end to the upper end of the column of item object 312 ("climbing pole") on a screen 460.

Figure 10:
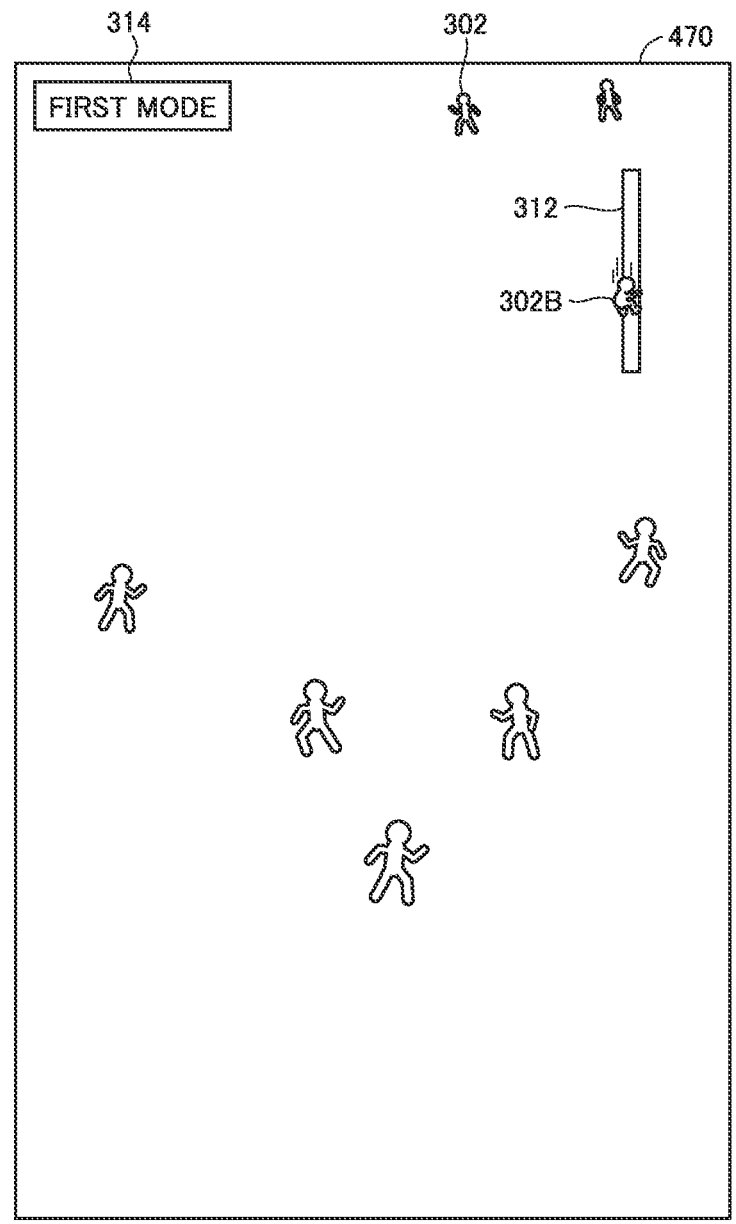
FIG. 10 shows an exemplary illustrative non-limiting drawing illustrating movement control (No. 2) of character object 302B with respect to item object 312 ("climbing pole") by second action control unit 208 in the game processing provided by game program 122 based on the embodiment.

FIG. 10 is a diagram illustrating movement control (No. 2) of character object 302B with respect to item object 312 ("climbing pole") by second action control unit 208 in game processing provided by game program 122 based on the embodiment.

FIG. 10 shows exemplary movement control in which second action control unit 208 controls character object 302B to move to the upper end of the column of item object 312 ("climbing pole") and thereafter to climb down to the lower end of the column of item object 312 ("climbing pole") on a screen 470.

Figure 11:
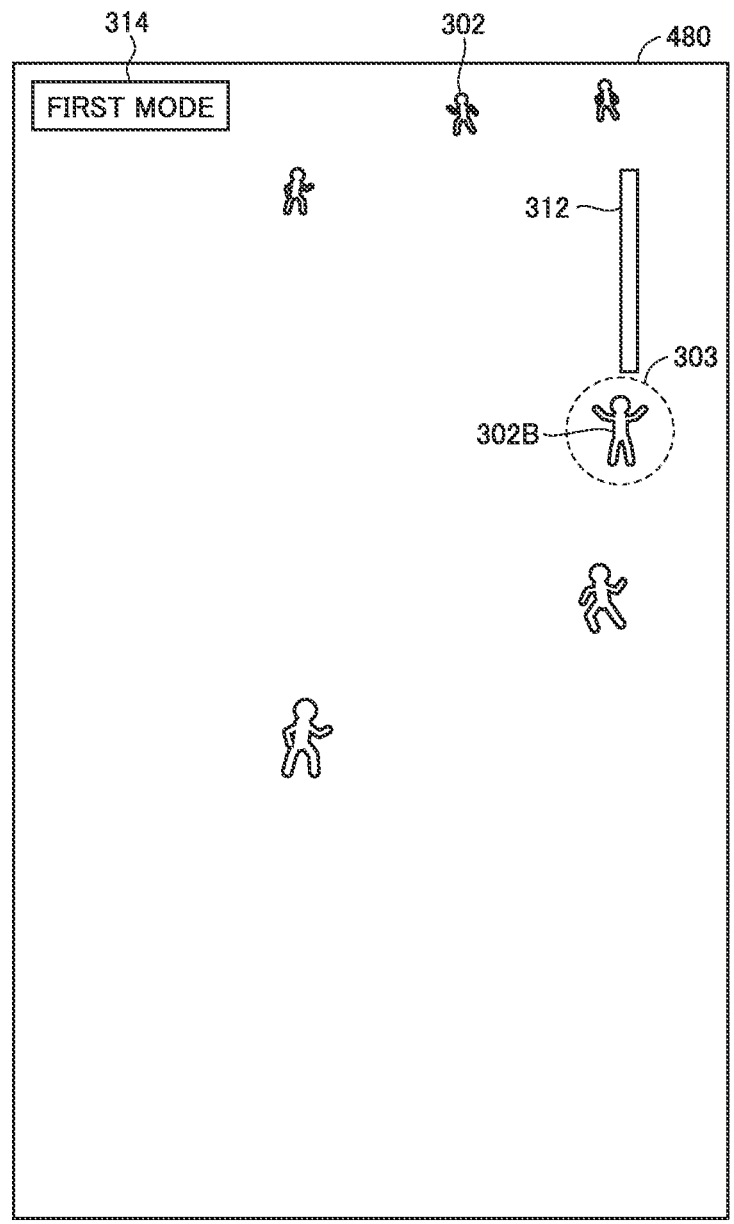
FIG. 11 shows an exemplary illustrative non-limiting drawing illustrating processing for giving a notification about mastery of an action by character object 302B with respect to item object 312 ("climbing pole") by action mastery notification unit 211 in the game processing provided by game program 122 based on the embodiment.

FIG. 11 is a diagram illustrating processing for giving a notification about mastery of the action by character object 302B with respect to item object 312 ("climbing pole") by action mastery notification unit 211 in game processing provided by game program 122 based on the embodiment.

FIG. 11 shows an example in which character object 302B climbs down the column of item object 312 ("climbing pole") on a screen 480 and thereafter action mastery notification unit 211 gives a notification about a state of mastery of the action to climb up item object 312 ("climbing pole"). A circle 303 means emphasized representation of character object 302B. Any scheme may be adopted so long as the user can be notified of change in state of character object 302B, and for example, a color of character object 302B may be changed, character object 302B may flash, or character object 302B may jump. Characters "mastered" may be shown.

On the assumption that character object 302B has mastered the "climbing" action brought in correspondence with item object 312 ("climbing pole"), action storage unit 202 thus has character object 302B and the "climbing" action stored in storage 120 in association with each other.

When a feature corresponding to item object 312 ("climbing pole") or a feature corresponding to the "climbing" action is included as a feature included in the real space image of augmented reality, character object 302B that has mastered the "climbing" action is subjected to movement control by first action control unit 207 to perform the "climbing" action at a position associated with the feature included in the real space image. By way of example, when presence of a geometrical object similar to the feature (column) of item object 312 ("climbing pole") in the real space image is recognized, character object 302B is subjected to movement control by first action control unit 207 to perform the "climbing" action at the position of the geometrical object.

Figure 12:
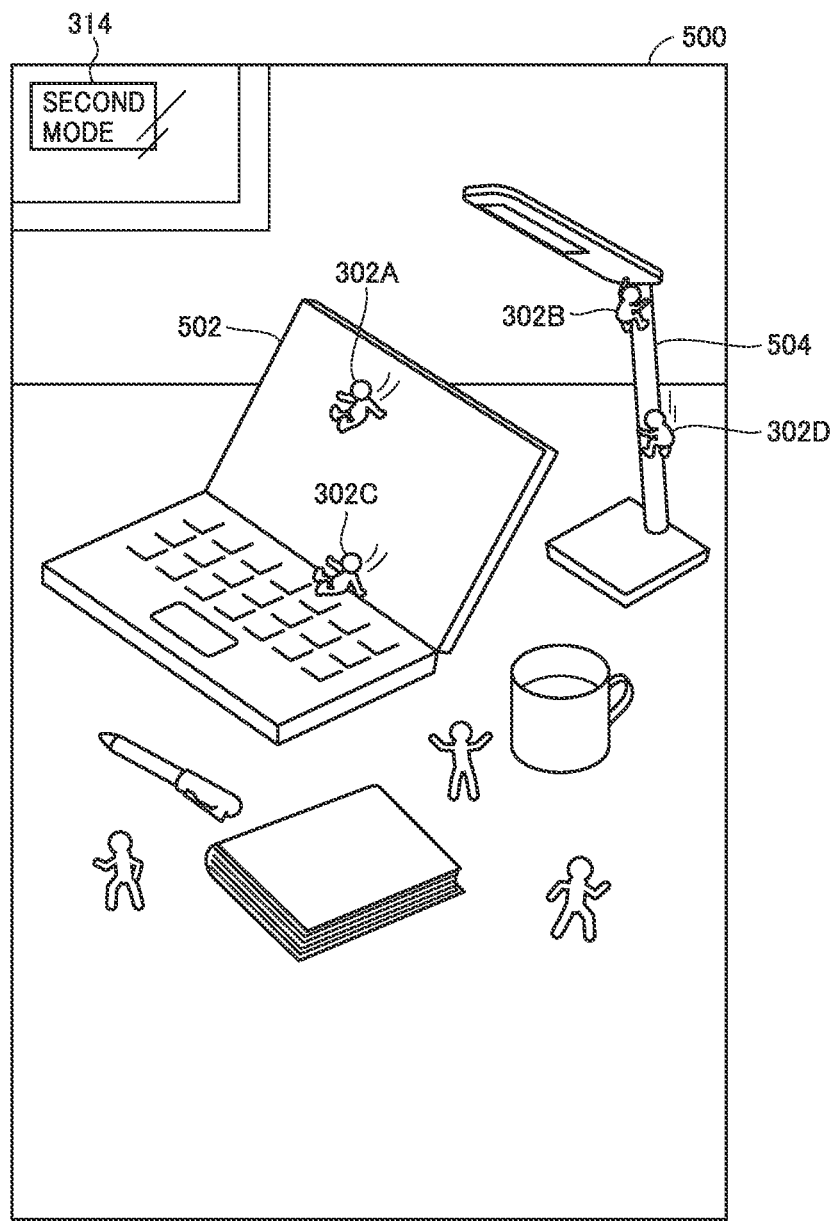
FIG. 12 shows an exemplary illustrative non-limiting drawing illustrating display on a display 104, of an augmented reality image in the game processing provided by game program 122 based on the embodiment.

FIG. 12 is a diagram illustrating an example in which an augmented reality image is shown on display 104 in game processing provided by game program 122 based on the embodiment.

FIG. 12 shows a screen 500. Screen 500 shows an augmented reality image obtained by superimposition of a virtual space image corresponding to the virtual space that has been picked up by the virtual camera arranged in the virtual space and a real space image corresponding to the real space that has been picked up by camera 101 on each other.

Screen 500 shows an example in which a plurality of character objects 302 arranged in the virtual space image are superimposed on the real space image.

Image recognition unit 206 recognizes a feature included in the real space image by performing image recognition processing on the real space image.

By way of example, the real space image includes a geometrical object 502 recognized as being similar to the slope of the "slide" as a feature corresponding to item object 310 as a result of image recognition by image recognition unit 206 and a geometrical object 504 recognized as being similar to the column of the "climbing pole" as a feature corresponding to item object 312.

Alternatively, the real space image may include geometrical object 502 recognized as being similar to the slope with respect to which an action is performed as the feature corresponding to the "sliding" action by image recognition by image recognition unit 206 and geometrical object 504 recognized as being similar to the column with respect to which an action is performed as the feature corresponding to the "climbing" action.

Character object 302 that has mastered the action is controlled to perform the action at the position associated with the feature included in the real space image when the feature corresponding to the item object corresponding to the action or the feature corresponding to the action is included in the real space image. Character object 302 that has not mastered the action does not perform the action.

For example, when the feature (slope) corresponding to item object 310 ("slide") corresponding to the mastered "sliding" action or the feature (slope) corresponding to the "sliding" action is included in the real space image, character object 302A that has mastered the "sliding" action is subjected to movement control to perform the "sliding" action at the position associated with the feature (slope) included in the real space image.

When the feature (column) corresponding to item object 312 ("climbing pole") corresponding to the mastered "climbing" action or the feature (column) corresponding to the "climbing" action is included in the real space image, character object 302B that has mastered the "climbing" action is subjected to movement control to perform the "climbing" action at the position associated with the feature (column) included in the real space image.

When the feature (slope) corresponding to item object 310 ("slide") corresponding to the mastered "sliding" action or the feature (slope) corresponding to the "sliding" action is included in the real space image, a character object 302C that has mastered the "sliding" action is subjected to movement control to perform the "sliding" action at the position associated with the feature (slope) included in the real space image.

When the feature (column) corresponding to item object 312 ("climbing pole") corresponding to the mastered "climbing" action or the feature (column) corresponding to the "climbing" action is included in the real space image, a character object 302D that has mastered the "climbing" action is subjected to movement control to perform the "climbing" action at the position associated with the feature (column) included in the real space image.

Since character object 302 other than character objects 302A to 302D has not mastered the action, it does not perform the action.

In the embodiment, in the augmented reality image, the feature included in the real space image is recognized, and when the feature corresponding to the item object corresponding to the action mastered by the character object or the feature corresponding to the action is included as a result of recognition, the character object is subjected to movement control to perform the action at the position associated with the feature included in the real space image. Therefore, processing of operations of the character object high in zest can be performed.

[E. Processing Procedure in Game Processing]

A processing procedure in game processing provided by execution of game program 122 according to the embodiment will now be described. Each step is performed by execution of game program 122 by CPU 102.

Figure 13:
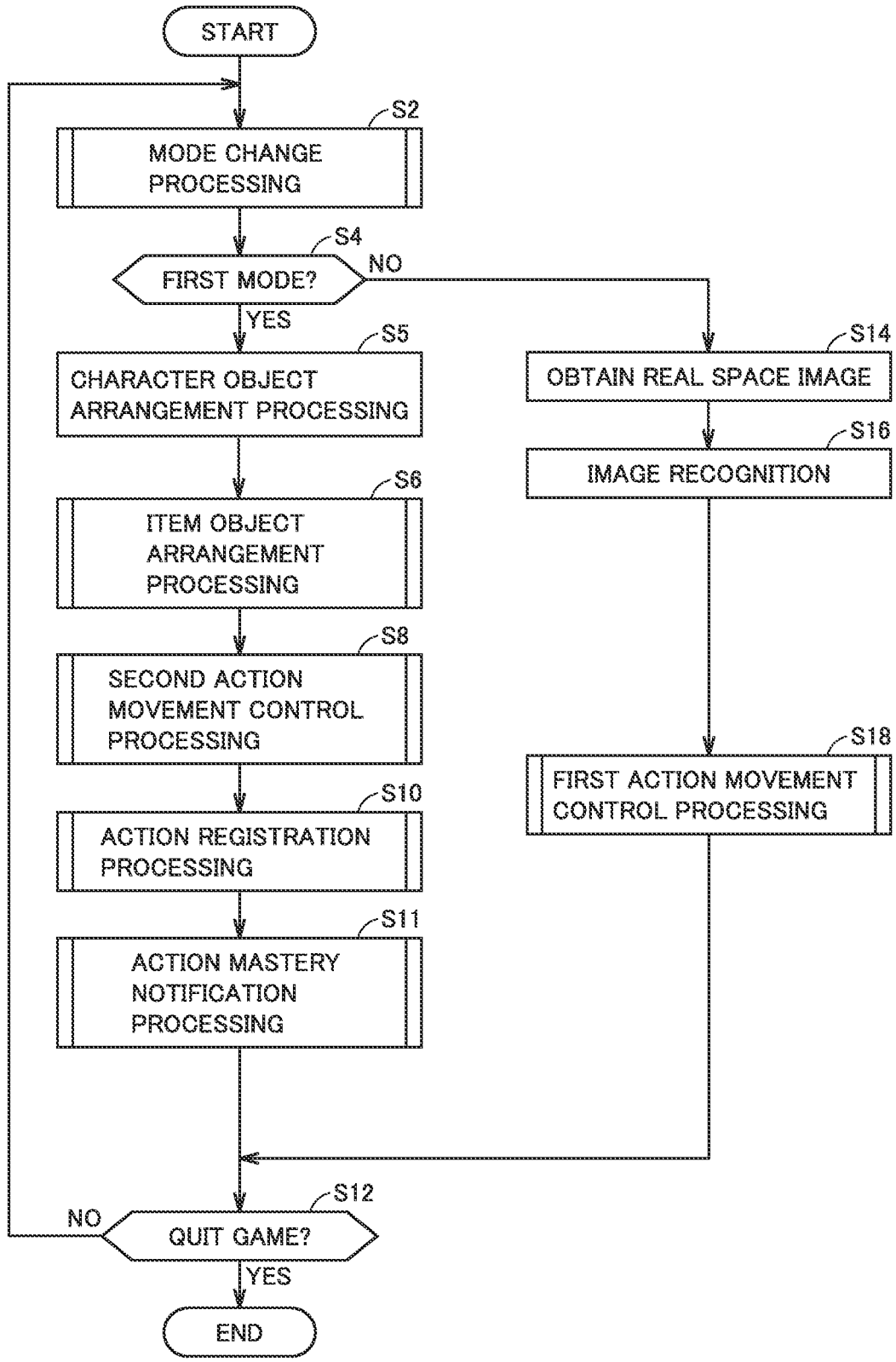
FIG. 13 shows an exemplary illustrative non-limiting flowchart illustrating the game processing provided by game program 122 based on the embodiment.

FIG. 13 is a flowchart illustrating the game processing provided by game program 122 based on the embodiment.

Referring to FIG. 13, mode changer 212 performs mode change processing (step S2). Details of the mode change processing will be described later.

Then, CPU 102 determines whether or not the first mode has been set (step S4).

Then, in step S4, when it is determined that the first mode has been set (YES in step S4), second arrangement unit 201 performs character object arrangement processing (step S5). Second arrangement unit 201 arranges a character object on the game field. Though second arrangement unit 201 can arrange a plurality of character objects on the game field, it may arrange a single character object. Though details will not be described, movement or the like of the arranged character object on the game field may be controlled under prescribed rules.

Then, first arrangement unit 200 performs item object arrangement processing (step S6). First arrangement unit 200 arranges an item object on the game field in accordance with an operation input from the user. Details of the item object arrangement processing will be described later.

Then, second action control unit 208 performs second action movement control processing (step S8). Details of the second action movement control processing will be described later.

Then, action storage unit 202 performs action registration processing (step S10). Details of the action registration processing will be described later.

Then, action mastery notification unit 211 performs action mastery notification processing for giving a user information indicating mastery by the character object, of the action brought in correspondence with the item object (step S11).

Then, CPU 102 determines whether or not to quit game processing (step S12).

In step S12, when CPU 102 determines to quit game processing (YES in step S12), the process ends (end).

When CPU 102 determines not to quit game processing (NO in step S12), the process returns to step S2.

In step S4, when CPU 102 determines that the first mode has not been set (NO in step S4), image recognition unit 206 obtains the real space image (step S14). Real space image generator 204 generates the real space image corresponding to the real space that has been picked up by camera 101 in the second mode and image recognition unit 206 obtains the real space image generated by real space image generator 204.

Then, image recognition unit 206 performs image recognition processing onto the obtained real space image (step S16). Image recognition unit 206 recognizes all features included in the real space image. Image recognition unit 206 recognizes a feature corresponding to the item object as a feature included in the real space image. Image recognition unit 206 recognizes a feature corresponding to a prescribed action as a feature included in the real space image.

For example, image recognition unit 206 recognizes a feature (slope) corresponding to item object 310 (slide). Image recognition unit 206 identifies whether or not there is a "slope" shape as the feature corresponding to item object 310 (slide). For example, when image recognition unit 206 recognizes a plane which is not horizontal with respect to the ground, it may recognize the plane as the "slope" shape. When an angle θ at a portion of connection between two adjacent planes is at a prescribed angle (0<θ<90°), image recognition unit 206 may recognize one of the two planes as the "slope" shape. Image recognition unit 206 recognizes a feature (column) corresponding to item object 312 (climbing pole). Image recognition unit 206 identifies whether or not there is a "column" shape as the feature corresponding to item object 312 (climbing pole). For example, when image recognition unit 206 recognizes the plane substantially perpendicular to the ground, it may recognize the plane as the "column" shape. Though an example in which image recognition unit 206 recognizes the feature (slope) corresponding to item object 310 (slide) is described in the present example, it may recognize a feature (slope) corresponding to the "sliding" action. Though an example in which image recognition unit 206 recognizes the feature (column) corresponding to item object 312 (climbing pole) is described, it may recognize a feature (column) corresponding to the "climbing" action.

Then, when the real space image includes the feature corresponding to the item object or the feature corresponding to the prescribed action as a result of recognition by image recognition unit 206 and when the action brought in correspondence with the item object or information indicating mastery of the prescribed action by the character object is stored in storage 120, first action control unit 207 performs first action movement control processing at the position associated with the feature included in the real space image (step S18). Details of the first action movement control processing will be described later. Then, CPU 102 has the process proceed to step S12.

Figure 14:
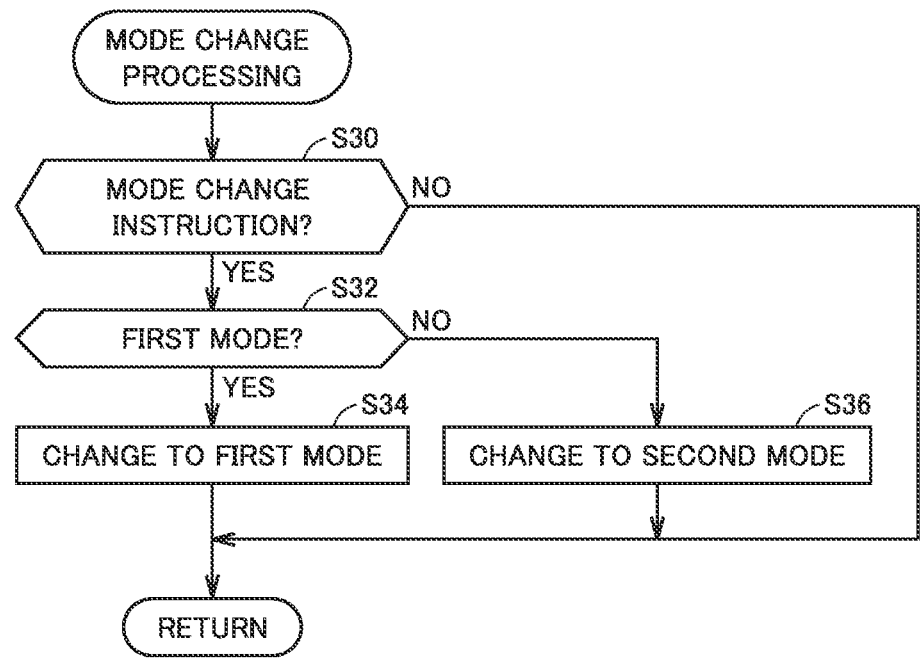
FIG. 14 shows an exemplary illustrative non-limiting flowchart illustrating processing by a mode changer 212 provided by game program 122 based on the embodiment.

FIG. 14 is a flowchart illustrating processing by mode changer 212 provided by game program 122 based on the embodiment.

Referring to FIG. 14, mode changer 212 determines whether or not an instruction for mode change has been given (step S30). By way of example, the mode changer determines whether or not an instruction onto mode change button 314 has been given. For example, when the user touches mode change button 314 in screen 400 in FIG. 3, the mode changer determines that an instruction onto mode change button 314 has been given.

When mode changer 212 determines in step S30 that an instruction for mode change has been given (YES in step S30), it determines whether it is an instruction for mode change to the first mode (virtual space mode) (step S32). For example, when the user touches mode change button 314 in the screen, mode changer 212 checks which mode has currently been set and determines whether or not the instruction is the instruction for mode change to the first mode (virtual space mode).

When mode changer 212 determines in step S32 that the instruction is the instruction for mode change to the first mode (virtual space mode) (YES in step S32), it changes to the first mode (virtual space mode) (step S34). For example, when the user touches mode change button 314 in screen 500 in FIG. 12, mode changer 212 determines that the instruction is the instruction for mode change to the first mode (virtual space mode) and changes to the first mode (virtual space mode).

Then, processing by mode changer 212 ends (return).

When mode changer 212 determines in step S32 that the instruction is not the instruction for mode change to the first mode (virtual space mode) (NO in step S32), that is, the instruction is an instruction for mode change to the second mode (augmented reality mode), it changes to the second mode (augmented reality mode) (step S36). For example, when the user touches mode change button 314 in screen 400 in FIG. 3, mode changer 212 determines that this instruction is the instruction for mode change to the second mode (augmented reality mode) and changes to the second mode (augmented reality mode).

Then, processing by mode changer 212 ends (return).

When mode changer 212 determines in step S30 that the instruction is not the instruction for mode change (NO in step S30), the process ends (return) with the mode being maintained.

In the present example, in the first mode (virtual space mode), virtual space image generator 203 generates the virtual space image corresponding to the virtual space that has been picked up by the virtual camera arranged in the virtual space and has the virtual space image shown on display 104. In the second mode (augmented reality space mode), augmented reality image generator 205 generates the augmented reality image by superimposing the virtual space image generated by virtual space image generator 203 that corresponds to the virtual space and has been picked up by the virtual camera arranged in the virtual space and the real space image generated by real space image generator 204 that corresponds to the real space and has been picked up by camera 101 on each other and has the augmented reality image shown on display 104.

Figure 15:
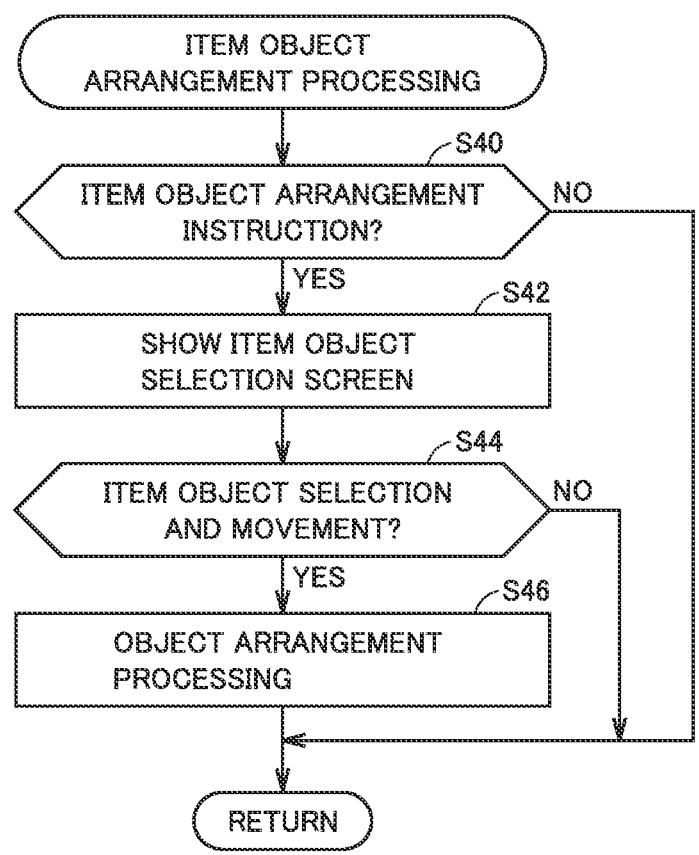
FIG. 15 shows an exemplary illustrative non-limiting flowchart illustrating item object arrangement processing by first arrangement unit 200 based on the embodiment.

FIG. 15 is a flowchart illustrating item object arrangement processing by first arrangement unit 200 based on the embodiment.

Referring to FIG. 15, first arrangement unit 200 determines whether or not an instruction to arrange an item object has been given (step S40). For example, when the user touches the game field on screen 400, it may be determined that the instruction to arrange an item object has been given. It may be determined that the instruction to arrange an item object has been given in accordance with a prescribed input operation onto input unit 110. A form of input onto input unit 110 is not limited.

When first arrangement unit 200 determines in step S40 that the instruction to arrange an item object has been given (YES in step S40), it has item object selection region 308 shown (step S42). For example, item object selection region 308 on screen 400 is shown.

Then, first arrangement unit 200 determines whether or not an item object has been selected (step S44). First arrangement unit 200 determines whether or not selection and movement of item objects 310 and 312 shown in item object selection region 308 has been made.

Then, when first arrangement unit 200 determines that selection and movement of an item object has been made (YES in step S44), it performs item object arrangement processing (step S46). For example, as shown on screen 410, first arrangement unit 200 arranges item object 310 (slide) at a position on the game field.

Item objects 310 ("slide") and 312 ("climbing pole") are each set as being movable by touching by the user. When the user moves a touch position while the user keeps touching item object 310 ("slide") beyond the dotted line, first arrangement unit 200 moves item object 310 ("slide") in accordance with the touch position to a position on the game field. When touching onto item object 310 ("slide") is canceled, first arrangement unit 200 arranges item object 310 ("slide") at the position resulting from movement over the game field. This is also applicable to item object 312 ("climbing pole").

Then, first arrangement unit 200 quits item object arrangement processing (return).

When first arrangement unit 200 determines in step S40 that the instruction for arranging the item object has not been given (NO in step S40), the process ends (return).

When first arrangement unit 200 determines in step S44 that selection and movement of the item object has not been made (NO in step S44), the process ends (return).

Figure 16:
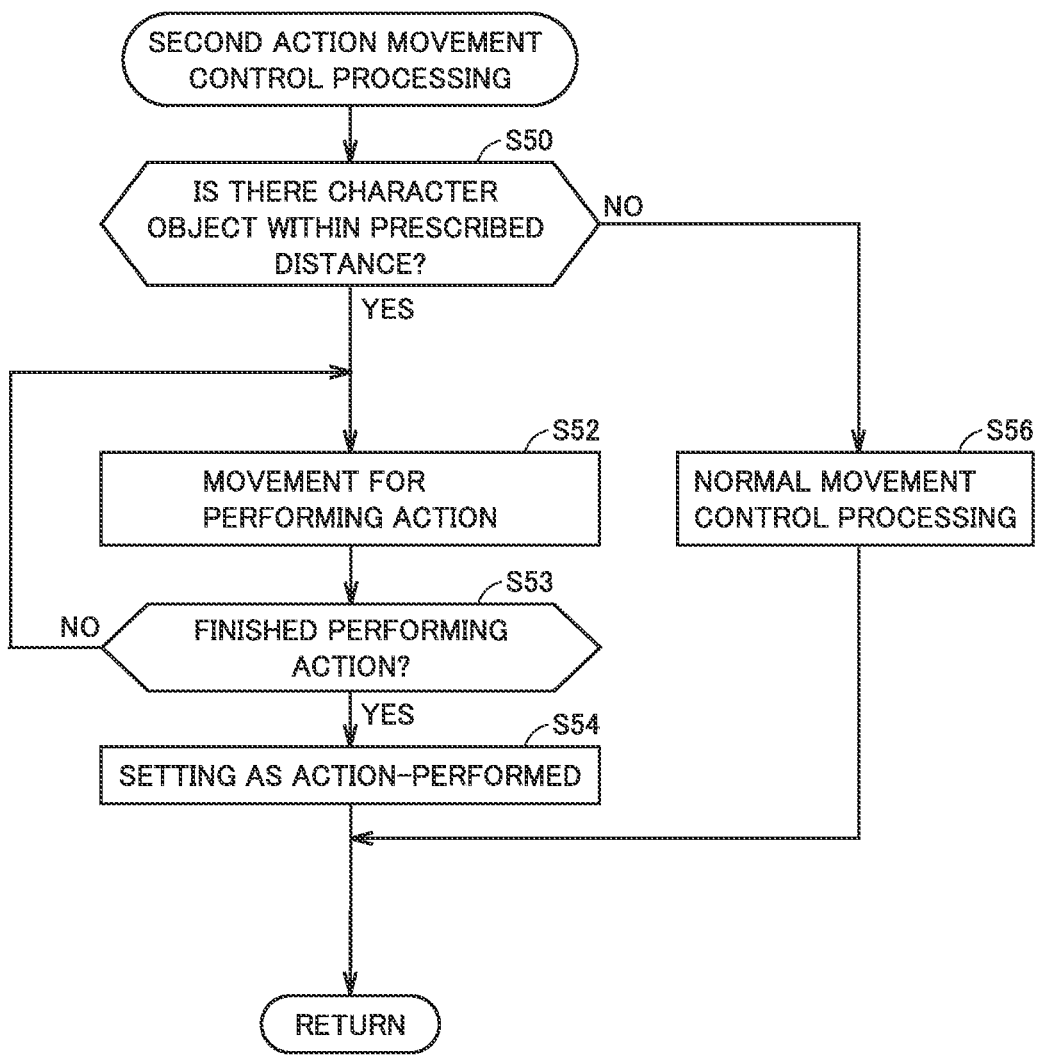
FIG. 16 shows an exemplary illustrative non-limiting flowchart illustrating second action movement control processing by second action control unit 208 based on the embodiment.

FIG. 16 is a flowchart illustrating second action movement control processing by second action control unit 208 based on the embodiment.

Referring to FIG. 16, second action control unit 208 determines whether or not a character object is present within a prescribed distance from a central point of the item object (step S50). For example, an example where character object 302A is present within a prescribed distance from the central point of item object 310 is shown on screen 410.

When second action control unit 208 determines in step S50 that the character object is present within the prescribed distance from the central point of the item object (YES in step S50), it performs processing for movement for performing the action (step S52).

As shown in screen 420 in FIG. 5, second action control unit 208 carries out movement control such that character object 302A moves to the lower end of the slope of item object 310 ("slide") and climbs up from the lower end to the upper end of the slope of item object 310 ("slide").

As shown in screen 430 in FIG. 6, second action control unit 208 carries out movement control such that character object 302A moves to the upper end of the slope of item object 310 ("slide") and thereafter slides down the slope of item object 310 ("slide").

Then, second action control unit 208 determines whether or not the character object has finished performing the action (step S53).

When second action control unit 208 determines that the character object has finished performing the action (YES in step S53), it sets action-performed (step S54).

Then, second action control unit 208 quits the process (return).

When second action control unit 208 determines in step S53 that the character object has not finished performing the action (NO in step S53), the process returns to step S52 and the processing is repeated until the character object finishes performing the action.

When second action control unit 208 determines in step S50 that the character object is not present within the prescribed distance from the central point of the item object (NO in step S50), it performs normal movement control processing (step S56). Second action control unit 208 may move character object 302 in a random direction as normal movement control processing.

Then, second action control unit 208 quits the process (return).

Figure 17:
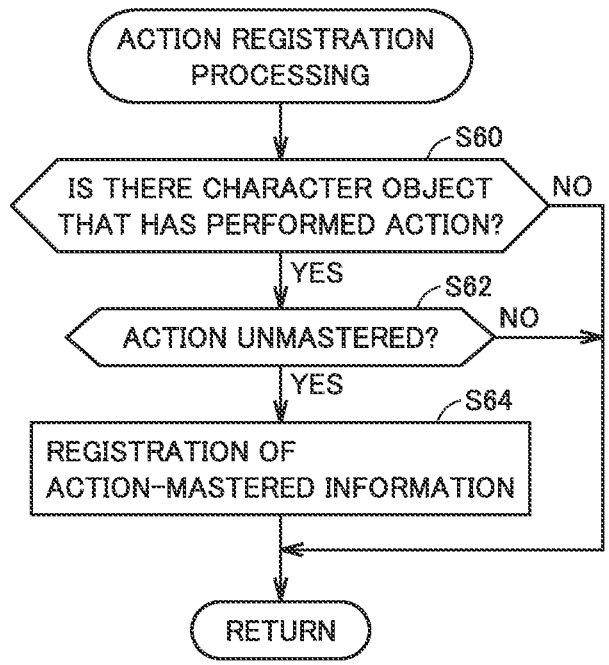
FIG. 17 shows an exemplary illustrative non-limiting flowchart illustrating processing by an action storage unit 202 provided by game program 122 based on the embodiment.

FIG. 17 is a flowchart illustrating processing by action storage unit 202 provided by game program 122 based on the embodiment.

Referring to FIG. 17, action storage unit 202 determines whether or not there is a character object that has performed the action (step S60).

When action storage unit 202 determines in step S60 that there is a character object that has performed the action (YES in step S60), it determines whether or not the action has been unmastered by the character object (step S62). Specifically, action storage unit 202 determines whether or not an action mastery flag of a corresponding character object indicates NG by referring to a mastery table in FIG. 18.

When action storage unit 202 determines in step S62 that the action has been unmastered by the character object (YES in step S62), it has action-mastered information registered (step S64). Specifically, action storage unit 202 sets the action mastery flag of the corresponding character object to OK by referring to a mastery table in FIG. 18.

Then, action storage unit 202 quits the process (return).

When action storage unit 202 determines in step S60 that there is no character object that has performed the action (NO in step S60), the process ends (return).

When action storage unit 202 determines in step S62 that the action has not been unmastered by the character object, that is, the character object has mastered the action (NO in step S62), the process ends (return). Specifically, when the action mastery flag of the corresponding character object indicates OK by reference to the mastery table in FIG. 18, action storage unit 202 quits the process because registration has already been done.

In the present example, an example in which when there is a character object that has performed the action, action storage unit 202 has information registered, the information indicating that the character object has mastered the action, is described. Alternatively, at least based on arrangement of the character object and the item object on the game field, action storage unit 202 may have information registered, the information indicating that the character object has mastered the action.

When there is a character object that has performed the action, action storage unit 202 may have information registered, with not only the character object but also a plurality of other character objects being regarded as having mastered the action. By way of example, an effect of action mastery may propagate to other character objects. For example, action storage unit 202 may have information registered, with a character object within a prescribed distance from the character object that has performed the action being also regarded as having mastered the action.

Alternatively, action storage unit 202 may have information registered, with another character object that has seen a character object that had performed the action being also regarded as having mastered the action. Alternatively, when the character object that has performed the action establishes eye contact with another character object, action storage unit 202 may have information registered, with that another character object being regarded as having mastered the action. For example, when an angle formed between an orientation (a direction of line of sight) of the character object that has performed the action and an orientation (a direction of line of sight) of another character object is 180° (eye contact), action storage unit 202 may have information registered, with another character object being regarded as having mastered the action.

When there are a plurality of types of character objects as the character object, action storage unit 202 may have information registered, with only a prescribed type of character object being regarded as having mastered the action. For example, action storage unit 202 may have information registered with a first type of character object being regarded as having mastered the action, and may not have information registered with a second type of character object being regarded as having mastered the action. Alternatively, action storage unit 202 may make actions to be mastered different depending on a type of the character object.

FIG. 18 is a diagram illustrating a mastery table registered in processing by action storage unit 202 provided by game program 122 based on the embodiment. Referring to FIG. 18, in the mastery table stored in storage 120, information on a character object name, an action, and a mastery flag is registered in association.

By way of example, a "character AAA," a "character BBB," a "character CCC," and a "character DDD" are registered as character object names. For "character AAA," an action "sliding" and a mastery flag "OK" are registered in association. For "character BBB," an action "climbing" and the mastery flag "OK" are registered in association. For "character CCC," the action "sliding" and the mastery flag "OK" are registered in association. For "character DDD," the action "climbing" and the mastery flag "OK" are registered in association. A single character object may be able to master only a single action, or a single character object may be able to master a plurality of actions.

Figure 19:
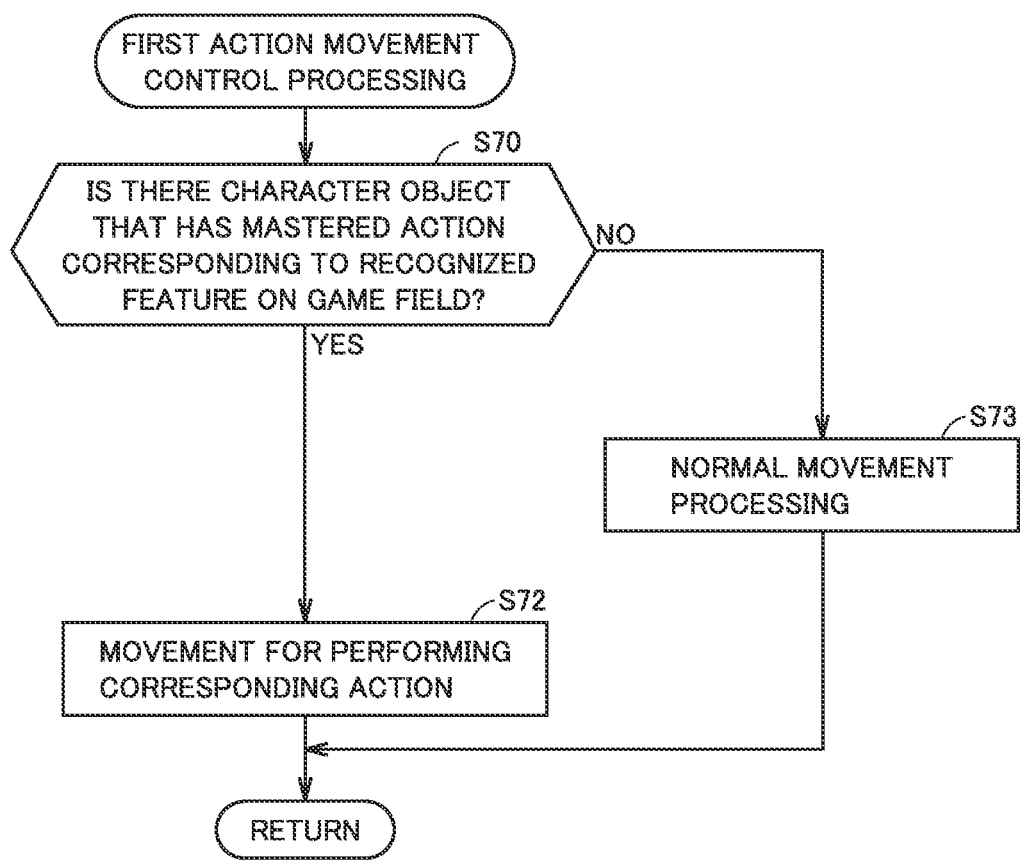
FIG. 19 shows an exemplary illustrative non-limiting flowchart illustrating processing by a first action control unit 207 provided by game program 122 based on the embodiment.

FIG. 19 is a flowchart illustrating processing by first action control unit 207 provided by game program 122 based on the embodiment.

Referring to FIG. 19, when the real space image includes a feature as a result of recognition by image recognition unit 206, first action control unit 207 determines whether or not there is a character object that has mastered the action brought in correspondence with the feature on the game field (step S70). More specifically, when there is a feature corresponding to the item object in the real space image, the first action control unit determines whether or not there is a character object that has mastered the action brought in correspondence with the item object on the game field. Alternatively, when the real space image includes a feature corresponding to a prescribed action, the first action control unit determines whether or not there is a character object that has mastered the prescribed action on the game field.

First action control unit 207 determines whether or not there is a character object associated with the action "sliding" or "climbing" and labeled with the mastery flag "OK" by referring to the mastery table in FIG. 18.

When the real space image includes the feature as a result of recognition by image recognition unit 206 and when first action control unit 207 determines in step S70 that there is a character object that has mastered the action brought in correspondence with the feature on the game field (YES in step S70), it controls movement for performing the corresponding action at the position associated with the feature included in the real space image (step S72). When there is a feature corresponding to the item object in the real space image and when first action control unit 207 determines that there is a character object that has mastered the action brought in correspondence with the item object on the game field, it controls movement for performing the corresponding action at the position associated with the feature included in the real space image. When there is a feature corresponding to a prescribed action in the real space image and when first action control unit 207 determines that there is a character object that has mastered the action on the game field, it controls movement for performing the corresponding action at the position associated with the feature included in the real space image.

By way of example, first action control unit 207 carries out movement control such that character object 302A that has mastered the "sliding" action performs the "sliding" action with respect to geometrical object 502 ("slope") recognized as being similar to the slope of the "slide" as the feature corresponding to item object 310 ("slide"). First action control unit 207 carries out movement control such that character object 302B that has mastered the "climbing" action performs the "climbing" action with respect to geometrical object 504 ("column") recognized as being similar to the "column" of the "climbing pole" as the feature corresponding to item object 312 ("climbing pole").

First action control unit 207 may carry out movement control such that character object 302A that has mastered the "sliding" action performs the "sliding" action with respect to geometrical object 502 ("slope") recognized as being similar to the slope as the feature corresponding to the "sliding" action. First action control unit 207 may carry out movement control such that character object 302B that has mastered the "climbing" action performs the "climbing" action with respect to geometrical object 504 ("column") recognized as being similar to the "column" as the feature corresponding to the "climbing" action.

Then, first action control unit 207 quits the process (return).

When the real space image includes the feature as a result of recognition by image recognition unit 206 and when there is no character object that has mastered the action brought in correspondence with the feature on the game field in step S70 (NO in step S70), first action control unit 207 performs normal movement control processing (step S73). First action control unit 207 may move character object 302 in the random direction as normal movement control processing.

Then, first action control unit 207 quits the process (return).

Though an example in which an action is not performed when the real space image includes a feature as a result of recognition by image recognition unit 206 and when there is no character object that has mastered the action brought in correspondence with the feature on the game field is described in the present example, a character object that has mastered the action may appear and first action control unit 207 may have that character object perform the action. The user can be notified of what kind of action will be performed by the character object in the real space image and zest can be enhanced.

Figure 20:
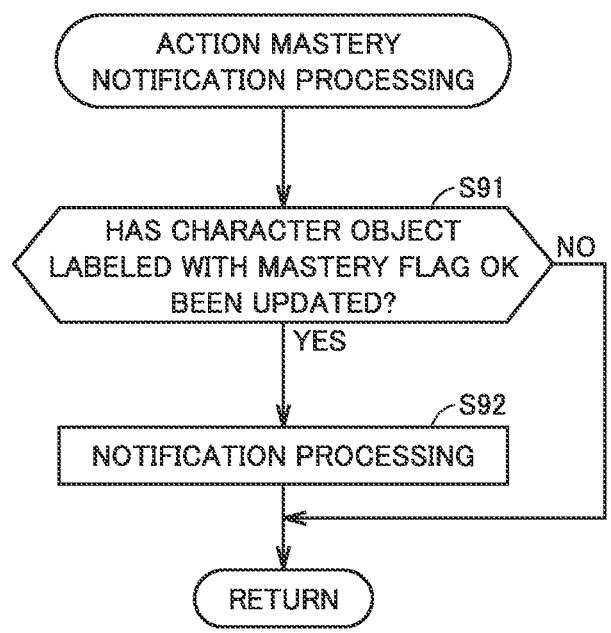
FIG. 20 shows an exemplary illustrative non-limiting flowchart illustrating processing by action mastery notification unit 211 provided by game program 122 based on the embodiment.

FIG. 20 is a flowchart illustrating processing by action mastery notification unit 211 provided by game program 122 based on the embodiment.

Referring to FIG. 20, action mastery notification unit 211 determines whether or not a character object labeled with the mastery flag OK has been updated (step S91).

When action mastery notification unit 211 determines in step S91 that the character object labeled with the mastery flag OK has been updated (YES in step S91), it performs notification processing (step S92). For example, on screen 440 in FIG. 7, action mastery notification unit 211 performs notification processing for emphasized representation of character object 302A with circle 303. On screen 480 in FIG. 11, action mastery notification unit 211 performs notification processing for emphasized representation of character object 302B with circle 303. Without being limited to emphasized representation of character object 302A or character object 302B in its entirety, only a part of the character object such as a head part may be shown as being emphasized.

Then, action mastery notification unit 211 quits the process (return).

When action mastery notification unit 211 determines in step S91 that the character object labeled with the mastery flag OK has not been updated (NO in step S91), the process ends (return).

Through the process, with game program 122 according to the embodiment, in the first mode (virtual space mode), the user arranges an item object in the virtual space (on the game field by way of example) so that the character object masters the "sliding" action or the "climbing" action (skill) brought in correspondence with the item object. Then, in the second mode (augmented reality mode), the character object performs the mastered "sliding" action or "climbing" action (skill) at the position associated with the feature included in the real space image. In the second mode (augmented reality mode), processing of operations of the character object high in zest can thus be performed.

In the first mode (virtual space mode), the user arranges an item object in the virtual space (on the game field by way of example) so that the character object performs the "sliding" action brought in correspondence with the item object. Therefore, the user can be notified in advance of what kind of action the character object will perform in the second mode (augmented reality mode).

Therefore, in the second mode (augmented reality mode), in which direction camera 101 is oriented can be taught in advance. In the second mode (augmented reality mode), an image of what is to be picked up by camera 101 to have the character object perform an action, that is, an object of which image is to be picked up, can be taught. A user's experience can thus be improved.

(First Modification)

In a first modification, an example in which action storage unit 202 has action-mastered information registered based on a plurality of times of actions performed by a character object will be described.

Figure 21:
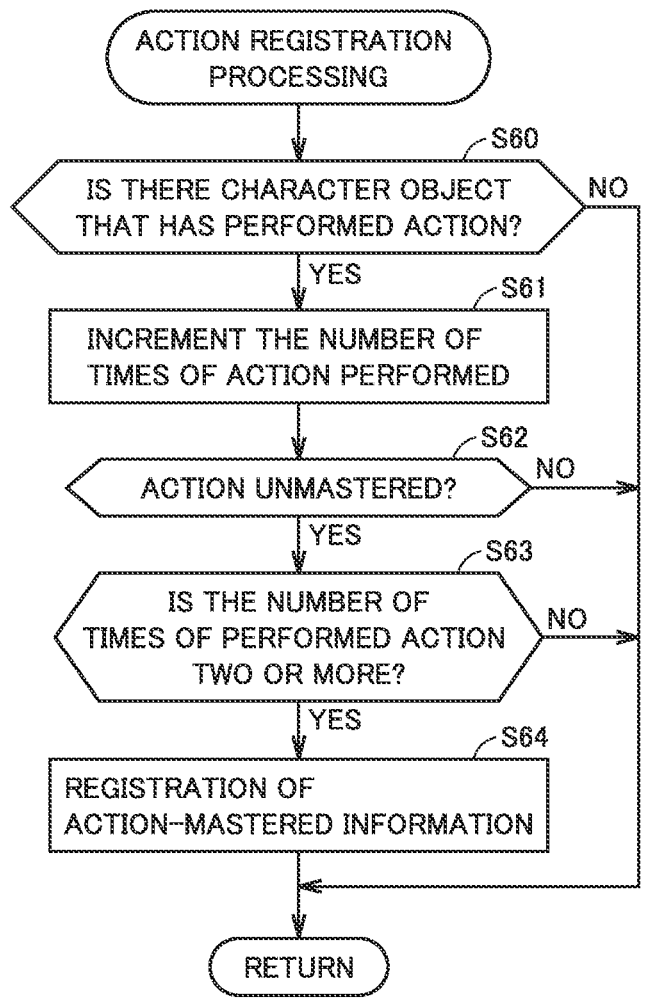
FIG. 21 shows an exemplary illustrative non-limiting flowchart illustrating processing by action storage unit 202 provided by game program 122 based on a first modification of the embodiment.

FIG. 21 is a flowchart illustrating processing by action storage unit 202 provided by game program 122 based on the first modification of the embodiment.

FIG. 21 is different from the flowchart in FIG. 17 in addition of steps S61 and S63. FIG. 21 is otherwise the same in flow as FIG. 17. In step S60, when action storage unit 202 determines that there is a character object that has performed the action (YES in step S60), it increments the number of times of performed action corresponding to the character object and has the number of times registered (step S61). Specifically, action storage unit 202 updates the number of times of action performed by the corresponding character object in a mastery table in FIG. 22.

Then, action storage unit 202 determines whether or not the action has been unmastered by the character object (step S62). Specifically, action storage unit 202 determines whether or not the action mastery flag of the corresponding character object indicates NG by referring to the mastery table in FIG. 22.

When action storage unit 202 determines in step S62 that the action has been unmastered by the character object (YES in step S62), it determines whether or not the number of times of action performed by the character object is two or more (step S63). Specifically, action storage unit 202 determines whether or not the number of times of action performed by the corresponding character object is two or more by referring to the mastery table in FIG. 22.

When action storage unit 202 determines in step S63 that the number of times of action performed by the corresponding character object is two or more (YES in step S63), it has action-mastered information registered (step S64). Specifically, when action storage unit 202 determines that the number of times of action performed by the corresponding character object is two or more by referring to the mastery table in FIG. 22, it sets the mastery flag for the action by the corresponding character object in the mastery table to OK.

Then, action storage unit 202 quits the process (return).

When action storage unit 202 determines in step S63 that the number of times of action performed by the character object is smaller than two (NO in step S63), the process ends (return).

When action storage unit 202 determines in step S62 that the action has not been unmastered by the character object, that is, the character object has mastered the action (NO in step S62), the process ends (return). Specifically, when the mastery flag for the action by the corresponding character object indicates OK by reference to the obtainment table in FIG. 22, action storage unit 202 quits the process.

In the present example, when there is a character object that has performed the action, action storage unit 202 increments the number of times of action performed by the character object and has the number of times registered. Then, when the action storage unit determines that the number of times of action performed by the character object is two or more, it has action-mastered information registered.

FIG. 22 is a diagram illustrating a mastery table registered in processing by action storage unit 202 provided by game program 122 based on the first modification of the embodiment. Referring to FIG. 22, in the mastery table, information on a character object name, an action, the number of times of action performed, and the mastery flag is registered in association.

By way of example, a "character AAA," a "character CCC," a "character EEE," a "character FFF," and a "character GGG" are registered as character object names. For "character AAA," the action "sliding", the number of times of action performed "1", and a mastery flag "NG" are registered in association. For "character CCC," the action "sliding", the number of times of action performed "2", and the mastery flag "OK" are registered in association. For "character EEE," the action "sliding", the number of times of action performed "4", and the mastery flag "OK" are registered in association. For "character FFF," the action "sliding", the number of times of action performed "6", and the mastery flag "OK" are registered in association. For "character GGG," the action "sliding", the number of times of action performed "8", and the mastery flag "OK" are registered in association.

Since the mastery flag "OK" of the action "sliding" has been registered for the character objects "character CCC," "character EEE," "character FFF," and "character GGG," first action control unit 207 carries out movement control such that the "sliding" action is performed with respect to the geometrical object ("slope") recognized as being similar to the slope of the "slide" as the feature corresponding to item object 310 ("slide") by image recognition of the real space image.

In the processing, as the character object performs the action a plurality of times, action-mastered information is registered. Therefore, zest of the training game as the user's experience can be enhanced.

FIG. 23 is a diagram illustrating an action table of actions mastered in processing by action storage unit 202 provided by game program 122 based on the first modification of the embodiment. Referring to FIG. 23, in the action table, one of a plurality of "sliding" actions is brought in correspondence with the number of times of action performed (skill level). Specifically, a "sliding while sitting" action is registered in correspondence with the number of times of action performed ("2"), a "sliding on one's back" action is registered in correspondence with the number of times of action performed ("4"), a "sliding while facing rearward" action is registered in correspondence with the number of times of action performed ("6"), and a "sliding while turning" action is registered in correspondence with the number of times of action performed ("8").

The "sliding while sitting" action is an action to slide down the slope of the "slide" while the character object maintains its sitting position. The "sliding on one's back" action is an action to slide down the slope of the "slide" while the character object maintains its position as lying on its back. The "sliding while facing rearward" action is an action to slide down the slope of the "slide" while the character object maintains its rearward-facing position. The "sliding while turning" action is an action to slide down the slope of the "slide" while the character object is turning.

Since first action control unit 207 finds that the mastery flag "OK" for the action "sliding" is registered for character objects "character CCC," "character EEE," "character FFF," and "character GGG" by referring to the mastery table in FIG. 22 and the action table in FIG. 23, first action control unit 207 carries out movement control such that various "sliding" actions are performed with respect to the geometrical object ("slope") recognized as being similar to the slope of the "slide" as the feature corresponding to item object 310 ("slide") as a result of image recognition of the real space image.

First action control unit 207 has the character object "character CCC" perform the "sliding while sitting" action as the "sliding" action.

First action control unit 207 has the character object "character EEE" perform the "sliding on one's back" action as the "sliding" action.

First action control unit 207 has the character object "character FFF" perform the "sliding while facing rearward" action as the "sliding" action.

First action control unit 207 has the character object "character GGG" perform the "sliding while turning" action as the "sliding" action.

As the type of the action performed by the character object is varied in accordance with the number of times of action performed (skill level), zest is enhanced.

FIG. 24 is a diagram illustrating another action table of actions mastered in processing by action storage unit 202 provided by game program 122 based on the first modification of the embodiment.

Referring to FIG. 24, in the action table, one of a plurality of "sliding" actions is brought in correspondence with a manner of arrangement of item objects.

First arrangement unit 200 arranges an item object in a manner in accordance with an instruction from the user. Specifically, first arrangement unit 200 can arrange item objects around a central point in accordance with the instruction from the user. For example, an initial position (0°) of the item object is defined as arrangement T1. A position of the item object turned by 90° is defined as arrangement T2. A position of the item object turned by 180° is defined as arrangement T3. A position of the item object turned by 270° is defined as arrangement T4.

In the present example, the "sliding while sitting" action is registered in correspondence with arrangement T1, the "sliding on one's back" action is registered in correspondence with arrangement T2, the "sliding while facing rearward" action is registered in correspondence with arrangement T3, and the "sliding while turning" action is registered in correspondence with arrangement T4.

When the item object and the character object are arranged in the virtual space (on the game field by way of example), on the assumption that the character object has mastered the action brought in correspondence with the item object based on the manner of arrangement, action storage unit 202 may have the character object and the action stored in storage 120 in association with each other. For example, when the manner of arrangement of the item object falls under arrangement T1, on the assumption that the character object has mastered the "sliding while sitting" action, action storage unit 202 may have the character object and the action stored in storage 120 in association with each other. This is also applicable to other cases.

As the type of the action performed by the character object is varied in accordance with the manner of arrangement of the item object in accordance with the instruction from the user, zest is enhanced.

Though an example in which the manner of arrangement of the item object is different by turning of the item object is described in the present example, the manner of arrangement is not particularly limited as such. For example, the manner of arrangement may be changed in accordance with a position where an item object is arranged on the game field. For example, arrangement in an A region on the game field may be defined as arrangement T1, arrangement in a B region may be defined as arrangement T2, arrangement in a C region may be defined as arrangement T3, and arrangement in a D region may be defined as arrangement T4.

A character object may master a single action with respect to a single item object, or as shown in the example, a character object may be able to master at least one of a plurality of actions with respect to a single item object.

Character objects may master different actions or one common action with respect to a plurality of item objects.

(Second Modification)

In a second modification of the embodiment, production of a game event is described. When a status of a game satisfies a prescribed condition in game processing, game event processing unit 209 produces a game event. For example, examples of a prescribed condition for production of a game event include clearing of a stage of a game by a user or level increase. A game event may be produced also when points possessed by the user are consumed or the user pays money. A fee may be charged in virtual currency.

Figure 25:
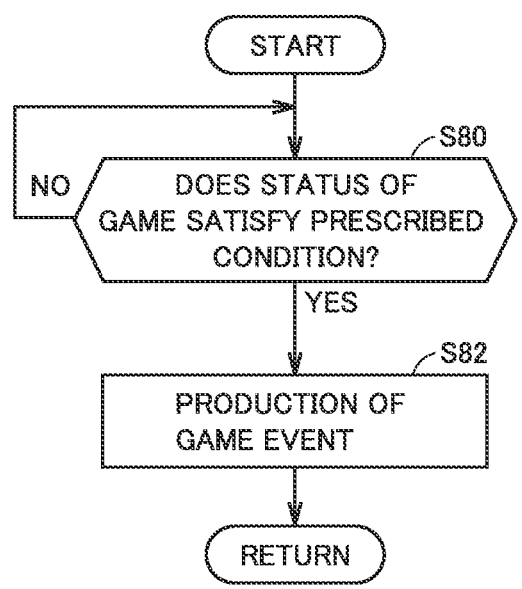
FIG. 25 shows an exemplary illustrative non-limiting flowchart illustrating processing by a game event processing unit 209 provided by game program 122 based on a second modification of the embodiment.

FIG. 25 is a flowchart illustrating processing by game event processing unit 209 provided by game program 122 based on the second modification of the embodiment.

Referring to FIG. 25, game event processing unit 209 determines whether or not a status of a game satisfies a prescribed condition (step S80). When the status of the game does not satisfy the prescribed condition, game event processing unit 209 does not perform subsequent processing.

When the status of the game satisfies the prescribed condition in step S80 (YES in step S80), game event processing unit 209 produces a game event (step S82).

Then, game event processing unit 209 quits the process (return).

Figure 26:
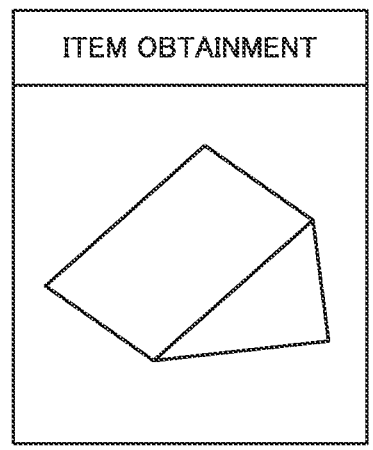
FIG. 26 shows an exemplary illustrative non-limiting drawing illustrating an exemplary game event produced by game event processing unit 209 provided by game program 122 based on the second modification of the embodiment.

FIG. 26 is a diagram illustrating an exemplary game event produced by game event processing unit 209 provided by game program 122 based on the second modification of the embodiment.

Referring to FIG. 26, an example in which an item object is given to a user as a game event produced by game event processing unit 209 will be described. By way of example, an example in which the item object ("slide") is given is shown. The user can select the item object ("slide") and arrange it on the game field as described above. As an item object is given as a game event, zest is enhanced.

[F. Additional Aspects]

Though an example in which first arrangement unit 200 arranges an item object on the game field in the first mode (virtual space mode) is described above, an item object may be arranged on the game field also in the second mode (augmented reality mode). In this case, a character object may master an action (skill) brought in correspondence with an item object also in the second mode (augmented reality mode).

Though an example in which a mastery table is stored in storage 120 of information processing apparatus 100 is described above, without being limited as such, it may be stored in a storage of an external server connected through network communication unit 106. This is also applicable to other mastery tables and action tables.

In the above, image recognition unit 206 recognizes a shape of an object as a feature included in the real space image. An example in which first action control unit 207 controls a character object to perform an action mastered thereby, at a position associated with a shape recognized as a result of recognition by image recognition unit 206 is described. In this regard, image recognition unit 206 may recognize another feature as a feature included in the real space image, without being limited to a shape of an object. For example, image recognition unit 206 may recognize a color of an object as the feature included in the real space image. First action control unit 207 may control the character object to perform an action mastered thereby, at a position associated with the feature (color) recognized as a result of recognition by image recognition unit 206. For example, image recognition unit 206 recognizes a color of an object as the feature included in the real space image. First action control unit 207 may control the character object to perform a "swimming" action exhibiting a state like swimming in water that is mastered by the character object, at a position associated with the feature (blue) recognized as a result of recognition by image recognition unit 206. First action control unit 207 may control the character object to perform a "feeling-hot behavior" action exhibiting a hot state that is mastered by the character object, at a position associated with the feature (red) recognized as a result of recognition by image recognition unit 206. First action control unit 207 may control the character object to perform a "sleeping" action exhibiting a sleeping state that is mastered by the character object, at a position associated with the feature (black) recognized as a result of recognition by image recognition unit 206.

For example, image recognition unit 206 may recognize brightness of an object as the feature included in the real space image. First action control unit 207 may control the character object to perform an action mastered thereby, at a position associated with the feature (brightness) recognized as a result of recognition by image recognition unit 206. For example, image recognition unit 206 recognizes brightness of an object as the feature included in the real space image. First action control unit 207 may control the character object to perform a "feeling-dazzled behavior" action exhibiting a dazzled state that is mastered by the character object, at a position associated with the feature (high brightness) recognized as a result of recognition by image recognition unit 206. First action control unit 207 may control the character object to perform a "feeling-dark behavior" action exhibiting a dark state that is mastered by the character object, at a position associated with the feature (low brightness) recognized as a result of recognition by image recognition unit 206.

For example, image recognition unit 206 may recognize a pattern of an object as the feature included in the real space image. First action control unit 207 may control the character object to perform an action mastered thereby, at a position associated with the feature (pattern) recognized as a result of recognition by image recognition unit 206. For example, image recognition unit 206 recognizes a pattern of an object as the feature included in the real space image. First action control unit 207 may control the character object to perform a "sniffing behavior" action exhibiting a state in which the character object takes a sniff of a flower that is mastered by the character object, at a position associated with the feature (flower pattern) recognized as a result of recognition by image recognition unit 206. First action control unit 207 may control the character object to perform an "umbrella opening" action exhibiting a state in which an umbrella is opened in the rain that is mastered by the character object, at a position associated with the feature (dot pattern) recognized as a result of recognition by image recognition unit 206.

Without being limited to direct information on an object as a feature included in the real space image, for example, image recognition unit 206 may recognize related information as the feature. For example, a type of an object may be recognized as the feature included in the real space image. First action control unit 207 may control the character object to perform an action mastered thereby, at a position associated with the feature (type) recognized as a result of recognition by image recognition unit 206. For example, image recognition unit 206 recognizes a type of an object as the feature included in the real space image. First action control unit 207 may control the character object to perform an "eating behavior" action exhibiting an eating state that is mastered by the character object, at a position associated with the feature (food) recognized as a result of recognition by image recognition unit 206. First action control unit 207 may control the character object to perform a "telephoning behavior" action exhibiting a state in which the character object is talking on a portable telephone that is mastered by the character object, at a position associated with the feature (portable telephone) recognized as a result of recognition by image recognition unit 206.

Though an example in which a "sliding" action is mastered in correspondence with item object 310 ("slide") and a "climbing" action is mastered in correspondence with item object 312 ("climbing pole") is described above, without being limited as such, an item object with respect to which various actions can be mastered can also be provided. For example, a "jumping up and down" action on a trampoline may be mastered in correspondence with an item object ("trampoline"). A "balanced walk" action to walk as keeping balance on a balance beam may be mastered in correspondence with an item object ("balance beam"). A "relaxing" action exhibiting a sitting state where a character object is relaxing in a private room may be mastered in correspondence with an item object ("private room"). A "drinking" action exhibiting a state of drinking water at a watering place may be mastered in correspondence with an item object ("watering place"). A "swinging while sitting" action to play on a swing as sitting on a seat of the swing or a "swinging while standing" action to play on a swing as standing on a seat of the swing may be mastered in correspondence with an item object ("swing"). A "twirling throwing" action to throw a rope while twirling the rope or a "rope climbing up and down" action to climb up and down a rope by gripping the rope may be mastered in correspondence with an item object ("rope"). A "wielding" action to wield a bar or a "bar climbing up and down" action to climb up and down a bar by gripping the bar may be mastered in correspondence with an item object ("bar"). A "falling-into-hole" action to fall into a hole and climb up from the hole may be mastered in correspondence with an item object ("hole"). A "moving sidewalk" action to move on a moving sidewalk may be mastered in correspondence with an item object ("moving sidewalk"). A "turning" action to turn round and round on a turning floor may be mastered in correspondence with an item object ("turning floor").

An example in which image recognition unit 206 recognizes a feature included in the real space image and first action control unit 207 controls a character object to perform a mastered action at a position associated with the feature recognized as a result of recognition by image recognition unit 206 is described above. In this regard, an object may newly be arranged at a position associated with the recognized feature and first action control unit 207 may control the character object to perform the mastered action with respect to the arranged object.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable information processing program executed in a computer of an information processing apparatus comprising an image pick-up unit that picks up an image of a real space, at least one computer being configured to perform operations comprising:
   arranging an object in a virtual space;
   arranging a character object in the virtual space;
   in a case where it is determined that the character object has mastered an action related to the object at least based on arrangement of the object and the character object in the virtual space, storing an indication for the character object and the mastered action in storage;

generating an augmented reality image by superimposing a virtual space image corresponding to the virtual space that has been picked up by a virtual camera arranged in the virtual space and a real space image corresponding to the real space that has been picked up by the image pick-up unit on each other;

recognizing a feature included in the real space image; and controlling, when the recognized feature in the real space image is a feature corresponding to the mastered action for the object, and after the indication is stored in the storage, the character object to perform the mastered action at a position associated with the recognized feature included in the real space image.

2. The non-transitory storage medium encoded with a computer readable information processing program according to claim 1, wherein when executed by the at least one computer, the computer readable information processing program further causes the at least one computer to determine whether the recognized feature is the feature corresponding to the mastered action for the object based on a characteristic of the object.

3. The non-transitory storage medium encoded with a computer readable information processing program according to claim 1, wherein when executed by the at least one computer, the computer readable information processing program further causes the at least one computer to determine whether the recognized feature is the feature corresponding to the mastered action for the object based on a characteristic of action which is mastered.

4. The non-transitory storage medium encoded with a computer readable information processing program according to claim 1, wherein when executed by the at least one computer, the computer readable information processing program further causes
the at least one computer to perform operations comprising controlling the character object to perform the action related to the object when the object and the character object are arranged in the virtual space when the character object is within a preset distance of the object, and
determining that the character object has mastered the action related to the object at least based on a fact that the character object has performed the action related to the object.

5. The non-transitory storage medium encoded with a computer readable information processing program according to claim 4, wherein the determining is at least based on a fact that the character object has performed, a plurality of times, the action related to the object and the storage stores an association of the plurality of times for the mastered action for the object and the character object.

6. The non-transitory storage medium encoded with a computer readable information processing program according to claim 4, wherein the storage stores an association of the character object, the action, and a skill level in connection with the action,
the action comprises a plurality of levels, and
the controlling the character object to perform the mastered action related to the object comprises controlling the character object to perform one action among the plurality of levels related to the object in accordance with the skill level in connection with the mastered action.

7. The non-transitory storage medium encoded with a computer readable information processing program according to claim 4, wherein
the controlling the character object to perform the mastered action comprises controlling, when the object and a plurality of character objects are arranged in the virtual space, only a character object that has mastered the action among the plurality of character objects to perform the mastered action.

8. The non-transitory storage medium encoded with a computer readable information processing program according to claim 7, wherein when executed by the at least one computer, the computer readable information processing program further causes the at least one computer to update the storage when it is determined that the character object that had not mastered the action has mastered the action related to the object at least based on a fact that the character object has performed the action.

9. The non-transitory storage medium encoded with a computer readable information processing program according to claim 1, wherein
the object comprises a plurality of types of objects,
the action comprises a plurality of types of actions, and
one action among the plurality of types of actions performed for each object.

10. The non-transitory storage medium encoded with a computer readable information processing program according to claim 1, wherein
the at least one computer is configured to perform operations comprising executing a game, and
giving at least one of a plurality of types of objects that can be arranged in the virtual space, in accordance with a status of the game.

11. The non-transitory storage medium encoded with a computer readable information processing program according to claim 1, wherein
the character object comprises a plurality of types of character objects, and
the storing comprises, in a case where it is determined that a prescribed type of character object among the plurality of types of character objects has mastered the action related to the object at least based on arrangement of the object and the prescribed type of character object in the virtual space, storing the prescribed type of character object and the mastered action in association with each other in the storage.

12. The non-transitory storage medium encoded with a computer readable information processing program according to claim 1, wherein
the at least one computer is configured to perform operations comprising giving a user information indicating mastery by the character object, of the action related to the object.

13. The non-transitory storage medium encoded with a computer readable information processing program according to claim 1, wherein
in a first mode, the object is arranged in the virtual space, the character object is arranged in the virtual space, and the character object and the action are stored in the storage in association with each other, and
in a second mode, the augmented reality image is generated by superimposition of the virtual space image corresponding to the virtual space that has been picked up by the virtual camera arranged in the virtual space and the real space image corresponding to the real space that has been picked up by the image pick-up unit on each other, the feature included in the real space image is recognized, and the character object is controlled to perform the mastered action at the position of the recognized feature.

14. The non-transitory storage medium encoded with a computer readable information processing program according to claim 1, wherein when executed by the at least one computer, the computer readable information processing program further causes the at least one computer to
determine whether the recognized feature correspond to the mastered action for the object based on at least to a shape of the feature included in the real space image.

15. The non-transitory storage medium encoded with a computer readable information processing program according to claim 1, wherein
the arranging an object in a virtual space comprises arranging the object in the virtual space in accordance with an operation by a user,
the action comprises a plurality of types of actions different for each manner of arrangement of the object, and
the storing comprises storing the character object and the mastered action in association with each other in a case that it is determined that the character object has mastered one action among the plurality of types of actions related to the object based on arrangement of the object and the character object in the virtual space and the manner of arrangement.

16. An information processing system comprising:
an information processing apparatus comprising an image pick-up unit that picks up an image of a real space, wherein
the information processing apparatus comprises
at least one computer, and
a memory,
the computer
arranges an object in a virtual space,
arranges a character object in the virtual space,
in a case where it is determined that the character object has mastered an action related to the object at least based on arrangement of the object and the character object in the virtual space, stores an indication for the character object and the mastered action in the memory,
generates an augmented reality image by superimposing a virtual space image corresponding to the virtual space that has been picked up by a virtual camera arranged in the virtual space and a real space image corresponding to the real space that has been picked up by the image pick-up unit on each other,
recognizes a feature included in the real space image, and
controls, when the recognized feature the real space image is a feature corresponding the mastered action for the object and after the indication is stored, the character object to perform the mastered action at a position associated with the recognized feature included in the real space image.

17. The information processing system according to claim 16, wherein the computer determines whether the recognized feature is the feature corresponding to the mastered action for the object based on a characteristic of the object.

18. The information processing system according to claim 16, wherein the computer determines whether the recognized feature is the feature corresponding to the mastered action for the object based on a characteristic of the action, which is mastered.

19. An information processing apparatus comprising an image pick-up unit that picks up an image of a real space, the information processing apparatus comprising:
at least one computer; and
a memory, wherein
the computer
arranges an object in a virtual space,
arranges a character object in the virtual space,
in a case where it is determined that the character object has mastered an action related to the object at least based on arrangement of the object and the character object in the virtual space, stores an indication in the memory for the character object and the mastered action,
generates an augmented reality image by superimposing a virtual space image corresponding to the virtual space that has been picked up by a virtual camera arranged in the virtual space and a real space image corresponding to the real space that has been picked up by the image pick-up unit on each other,
recognizes a feature included in the real space image, and
controls, when the recognized feature the real space image is a feature corresponding to the mastered action for the object and after the indication is stored, the character object to perform the mastered action at a position associated with the recognized feature included in the real space image.

20. A method of controlling an information processing apparatus comprising an image pick-up unit that picks up an image of a real space, the method comprising:
arranging an object in a virtual space;
arranging a character object in the virtual space;
in a case where it is determined that the character object has mastered an action related to the object at least based on arrangement of the object and the character object in the virtual space, storing an indication for the character object and the mastered action in association with each other;
generating an augmented reality image by superimposing a virtual space image corresponding to the virtual space that has been picked up by a virtual camera arranged in the virtual space and a real space image corresponding to the real space that has been picked up by the image pick-up unit on each other;
recognizing a feature included in the real space image; and
controlling, when the recognized feature the real space image is a feature corresponding to the mastered action for the object and after the indication is stored, the character object to perform the mastered action at a position associated with the recognized feature included in the real space image.

\* \* \* \* \*